United States Patent
Kanatake et al.

(10) Patent No.: US 8,638,646 B2
(45) Date of Patent: Jan. 28, 2014

(54) OPTICAL INFORMATION PROCESSING METHOD AND OPTICAL INFORMATION PROCESSING APPARATUS

(75) Inventors: Yusuke Kanatake, Tokyo (JP); Tomo Kishigami, Tokyo (JP); Yoshihiro Kiyose, Tokyo (JP); Nobuo Takeshita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 77 days.

(21) Appl. No.: 13/128,031

(22) PCT Filed: Dec. 7, 2009

(86) PCT No.: PCT/JP2009/006670
§ 371 (c)(1),
(2), (4) Date: May 6, 2011

(87) PCT Pub. No.: WO2010/067575
PCT Pub. Date: Jun. 17, 2010

(65) Prior Publication Data
US 2011/0235482 A1   Sep. 29, 2011

(30) Foreign Application Priority Data

Dec. 10, 2008  (JP) .................................. 2008-314348
Oct. 2, 2009   (JP) .................................. 2009-230314

(51) Int. Cl.
*G11B 7/00*  (2006.01)

(52) U.S. Cl.
USPC .................. 369/44.32; 369/44.23; 369/53.12; 369/53.23

(58) Field of Classification Search
USPC ........... 369/44.23, 44.32, 53.23, 53.28, 53.12
See application file for complete search history.

(56) References Cited

U.S. PATENT DOCUMENTS

| | | | | |
|---|---|---|---|---|
| 6,023,449 A * | 2/2000 | Chung | ..................... | 369/112.23 |
| 7,551,371 B2 * | 6/2009 | Abe | .............................. | 359/719 |
| 2002/0018406 A1 * | 2/2002 | Yamada | ..................... | 369/44.23 |
| 2002/0114231 A1 * | 8/2002 | Shirakawa et al. | ........ | 369/44.32 |
| 2002/0150016 A1 * | 10/2002 | Yasuda et al. | .............. | 369/53.22 |
| 2004/0136281 A1 | 7/2004 | Yanagisawa et al. | | |
| 2005/0047291 A1 * | 3/2005 | Kuze et al. | ................. | 369/44.32 |

(Continued)

FOREIGN PATENT DOCUMENTS

| | | |
|---|---|---|
| JP | 2002-324328 A | 11/2002 |
| JP | 2004-95106 A | 3/2004 |

(Continued)

*Primary Examiner* — Thomas Alunkal
(74) *Attorney, Agent, or Firm* — Birch, Stewart, Kolasch & Birch, LLP

(57) ABSTRACT

An optical information processing method and apparatus performs a light irradiating and receiving step, a signal processing step, and an adjusting step of a spherical aberration and a focus offset on the basis of shift amount of first and second control devices and a performance evaluation value. The performance evaluation values for first, second, third and fourth points in an x and y coordinate system are detected, in which an x-coordinate is one of the shift amount of the first control device and the shift amount of the second control device and a y-coordinate is the other, the first point, second and third points having the same y-coordinate and different x-coordinates with each other, the fourth point being provided on a first straight line passing through the first point and being different from the first point.

24 Claims, 22 Drawing Sheets

(56) References Cited

U.S. PATENT DOCUMENTS

| | | |
|---|---|---|
| 2005/0052964 A1* | 3/2005 | Fujita et al. .............. 369/44.29 |
| 2005/0141363 A1 | 6/2005 | Shimamoto et al. |
| 2006/0062098 A1* | 3/2006 | Miyake et al. ............ 369/44.11 |
| 2006/0104183 A1* | 5/2006 | Kataoka et al. .......... 369/112.01 |
| 2007/0058501 A1 | 3/2007 | Kurokawa et al. |
| 2007/0064552 A1 | 3/2007 | Kurokawa et al. |
| 2007/0159951 A1* | 7/2007 | Sagara ......................... 369/106 |
| 2008/0056077 A1* | 3/2008 | Miyaoka ................... 369/44.23 |
| 2009/0059742 A1* | 3/2009 | Luyten et al. ............ 369/44.23 |
| 2009/0080298 A1* | 3/2009 | Yamasaki et al. ........ 369/44.23 |

FOREIGN PATENT DOCUMENTS

| | | |
|---|---|---|
| JP | 2004-145987 A | 5/2004 |
| JP | 2005-196947 A | 7/2005 |
| JP | 2006-139841 A | 6/2006 |
| JP | 2007-80423 A | 3/2007 |
| JP | 2007-87483 A | 4/2007 |
| JP | 2007-122815 A | 5/2007 |
| JP | 2007-141377 A | 6/2007 |

* cited by examiner

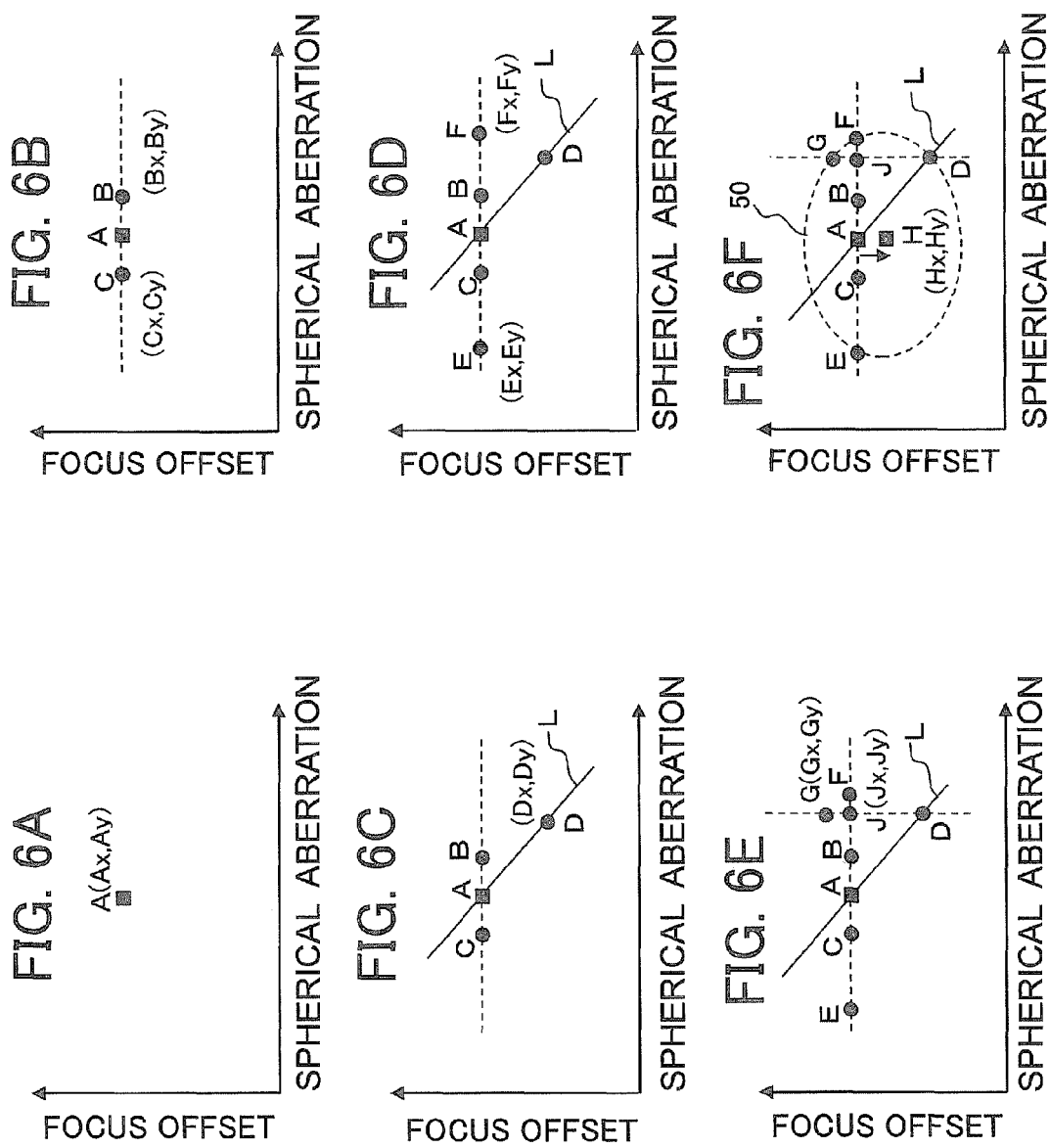

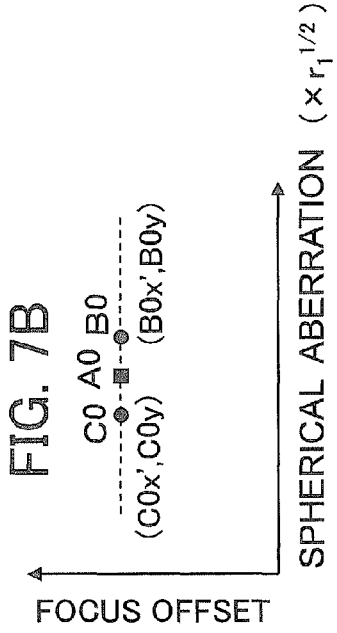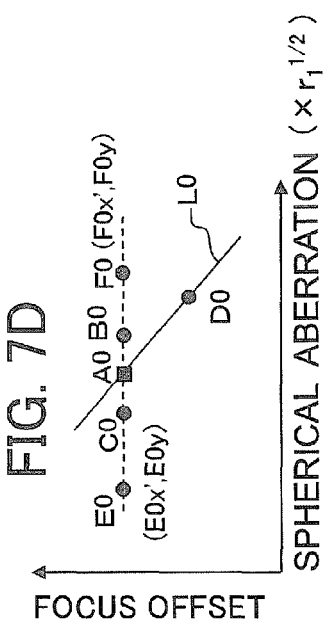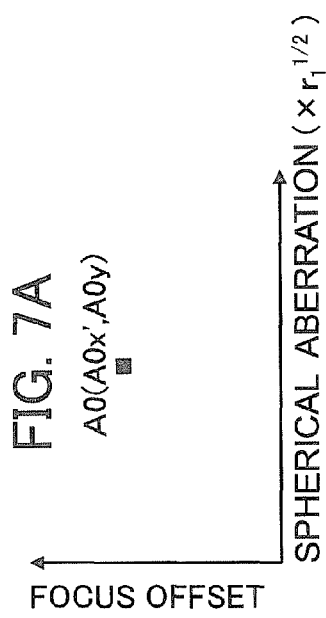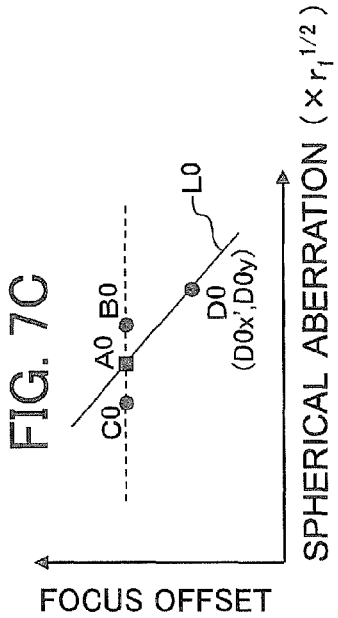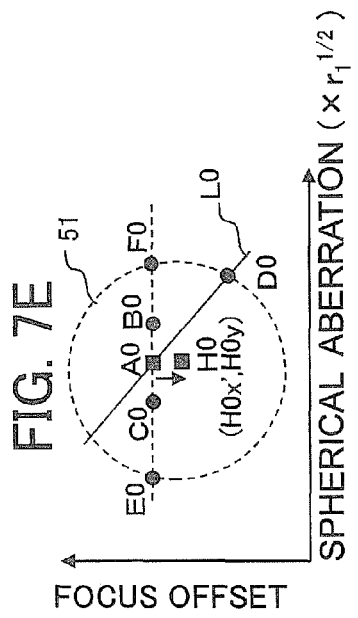

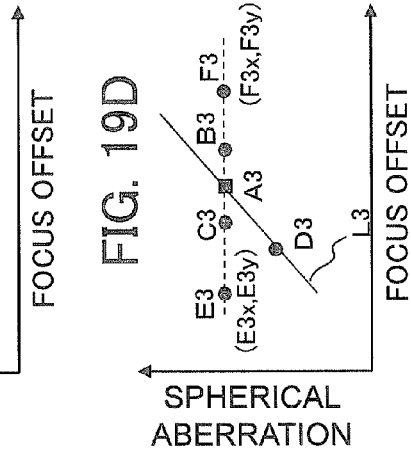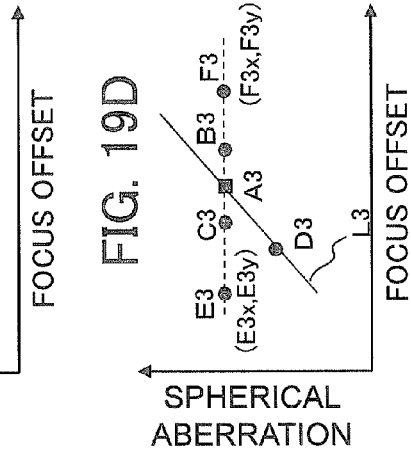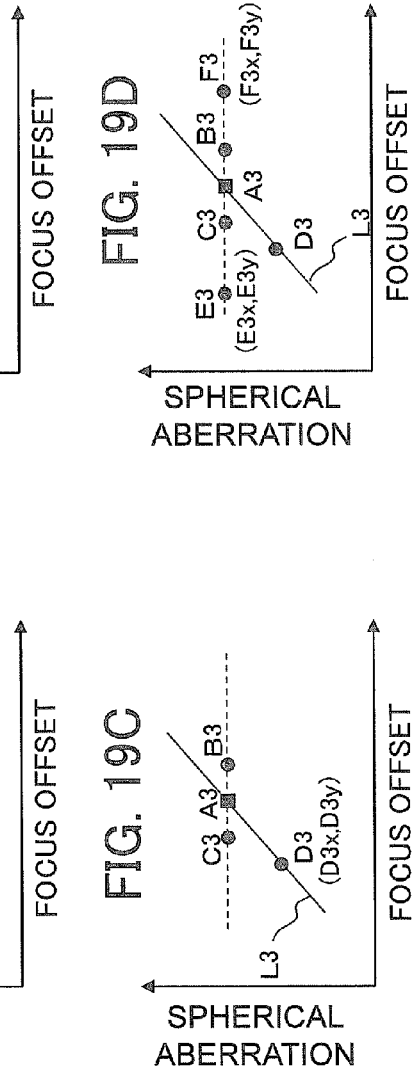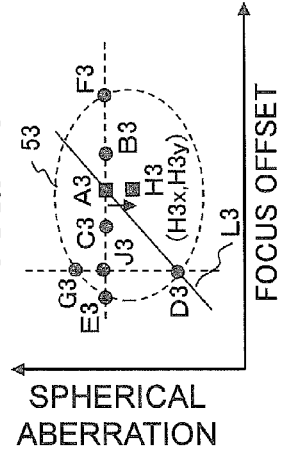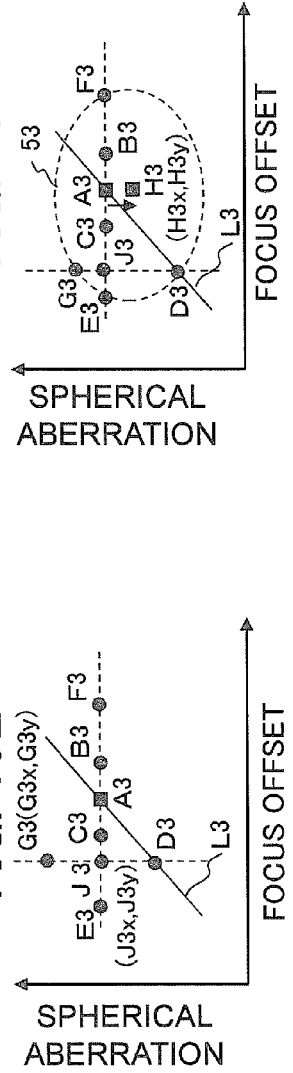

OPTICAL INFORMATION PROCESSING METHOD AND OPTICAL INFORMATION PROCESSING APPARATUS

TECHNICAL FIELD

The present invention relates to an optical information processing method for adjusting a spherical aberration and a focus offset in an apparatus for recording and/or reproducing data on an information recording surface of an optical disc, and an optical information processing apparatus for carrying out the method.

BACKGROUND ART

In order to realize high-density recording on a large-capacity optical disc, for example, a Blu-ray Disc (BD), it is necessary to reduce a light spot diameter of laser light irradiated onto an information recording surface of the optical disc. In order to make the light spot diameter small, it is necessary to shorten a wavelength of the laser light and to increase a numerical aperture (NA) of an objective lens, but this leads to increase of a spherical aberration. The spherical aberration is proportional to the fourth power of NA of the objective lens and is inversely proportional to a wavelength of a light flux. For this reason, a spherical aberration occurring when BD (wavelength of 405 nm; NA of 0.85) is reproduced is approximately 6.5 times ($\approx(0.85/0.6)^4 \times (650/405)$) in comparison with a spherical aberration occurring when DVD (wavelength of 650 nm; NA of 0.6) is reproduced. If the spherical aberration increases, a light spot of laser light irradiated onto the information recording surface of the optical disc changes in shape and reproduction performance is deteriorated. A value of the spherical aberration varies depending on a thickness error of a layer disposed on the information recording surface of the optical disc. Accordingly, in order to maintain high reproduction performance, it is important to perform adjustment so as to reduce the spherical aberration as much as possible.

Furthermore, the light spot of the laser light irradiated onto the information recording surface of the optical disc also varies in shape depending on performance of focus servo which makes the objective lens follow an optimum position in a direction perpendicular to the information recording surface of the optical disc. An appropriate adjustment of an offset value (focus offset) of the focus servo enables to improve the focus servo performance and to have an appropriate shape of the light spot on the information recording surface of the optical disc. Further, a value of the focus offset varies depending on a thickness error of the layer on the information recording surface of the optical disc. Accordingly, in order to improve the focus servo performance and maintain high reproduction performance, it is important to adjust the focus offset.

For example, Patent Document 1 discloses that characteristics of an amplitude value and a jitter value of a reproduction signal are represented by a concentric area whose center is an optimum amplitude value of the reproduction signal and a concentric area whose center is an optimum jitter value respectively, in a two-dimensional map whose horizontal and vertical axes represent a spherical aberration and a focus offset respectively, and discloses a method of adjusting a spherical aberration and a focus offset.

Further, Patent Document 2 discloses a method of adjusting a spherical aberration and a focus offset so that an amplitude value of a tracking error signal is the maximum.

Furthermore, Patent Document 3 discloses a method of causing a spherical aberration correcting means to be a set state that a focus loop gain value is maximum in a first process, supplying an offset value which makes an amplitude value of a tracking error signal maximum to a focus actuator in a second process, and then implementing the first process again.

Moreover, Patent Document 4 describes a method of measuring focus offset dependencies of a first evaluation indicator indicating information track crossing signal quality grade and a second evaluation indicator indicating information reproduction signal quality grade, at least two or more spherical aberration correction values, determining correlation between spherical aberration correction values of the first and second evaluation indicators and a focus offset optimum point as first and second polynomial approximation curves respectively, and setting an intersection of these first and second polynomial approximation curves as a desirable spherical aberration correction value and a focus offset value.

Background Art Document

Patent Document

Patent Document 1 is Japanese Patent Kokai Publication No. 2004-145987 (paragraphs 0046 to 0048 and 0055 to 0060, FIG. 3 and FIG. 6).

Patent Document 2 is Japanese Patent Kokai Publication No. 2004-095106 (paragraphs 0053, 0060, 0075 and 0083; FIG. 4 and FIG. 8).

Patent Document 3 is Japanese Patent Kokai Publication No. 2007-141377 (paragraphs 0045 and 0046; and FIG. 3).

Patent Document 4 is Japanese Patent Kokai Publication No. 2007-122815 (claim 1; paragraphs 0090 to 0097; FIG. 8 and FIG. 9).

DISCLOSURE OF THE INVENTION

Problems to be Solved by the Invention

Adjustment of a spherical aberration and a focus offset requires sufficient amplitude of a tracking error signal. However, in the method described in the Patent Document 1, an amplitude value of a tracking error signal does not have a characteristic to be a concentric area in a two-dimensional map of a spherical aberration and a focus offset. Thus, the method of adjusting the spherical aberration and the focus offset independently of the tracking error signal has a problem that sufficient amplitude of the tracking error signal cannot be obtained, an out-of-servo-control state (off-servo) occurs and adjustment operation may not stably progress.

In the methods of the Patent Documents 2 and 3, an amplitude value and a jitter value of a reproduction signal are not always optimum when an amplitude value of a tracking error signal is maximum. Thus, there is a problem that in some cases reproduction signal quality from an optical disc is not satisfactory when the adjustment is performed on the basis of an amplitude value of the tracking error signal.

In the method of the Patent Document 4, a focus offset optimum point is determined for each of an amplitude value of a tracking error signal and an amplitude value of a reproduction signal by a polynomial approximation curve, and it is necessary to perform the processing for a plurality of spherical aberrations. Thus, there is a problem that it takes a long time to adjust a spherical aberration and a focus offset.

The present invention is made to solve the problems of the conventional arts and an object of the present invention is to provide an optical information processing method and an optical information processing apparatus capable of performing adjustment for optimizing a spherical aberration and a focus offset in a short time without causing off-servo and without deteriorating reproduction signal quality.

Means of Solving the Problems

According to the present invention, an optical information processing method includes:

a light irradiating and receiving step of irradiating an information recording surface of an optical disc with laser light as a light collecting spot and detecting reflected light from the information recording surface of the optical disc;

a signal processing step of detecting shift amount of a first control device for controlling amount of a spherical aberration at the light collecting spot and shift amount of a second control device for controlling amount of a focus offset indicating a shift of the light collecting spot from a just focus, from a detection signal of the reflected light outputted in the light irradiating and receiving step, generating a reproduction signal, and detecting a performance evaluation value which indicates characteristic of the reproduction signal; and an adjusting step of adjusting the spherical aberration and the focus offset on the basis of the shift amount of the first control device, the shift amount of the second control device and the performance evaluation value;

wherein said signal processing step includes a detecting process of the performance evaluation values for xy-coordinates (x, y) at four points which are different from each other in an x and y coordinate system, in which an x-coordinate is one of the shift amount of the first control device and the shift amount of the second control device and a y-coordinate is the other.

Furthermore, according to the present invention, an optical information processing apparatus includes:

a light irradiating and receiving means for irradiating an information recording surface of an optical disc with laser light as a light collecting spot, and detecting reflected light from the information recording surface of the optical disc;

a signal processing means for detecting shift amount of a first control device for controlling amount of a spherical aberration of the light collecting spot and shift amount of a second control device for controlling amount of a focus offset indicating a shift of the light collecting spot from a just focus, from a detection signal of the reflected light outputted by the light irradiating and receiving means, generating a reproduction signal and detecting a performance evaluation value indicating characteristic of the reproduction signal; and an adjusting means for adjusting the spherical aberration and the focus offset, on the basis of the shift amount of the first control device, the shift amount of the second control device and the performance evaluation value;

wherein said signal processing means detects the performance evaluation value for xy-coordinates (x, y) at four points which are different from each other in an x and y coordinate system, in which an x-coordinate is one of the shift amount of the first control device and the shift amount of the second control device and a y-coordinate is the other.

Effects of the Invention

According to the present invention, an effect is achieved that an adjustment for optimizing a spherical aberration and a focus offset can be performed in a short time, without causing off-servo and without deteriorating reproduction signal quality in an apparatus for recording on and/or reproducing an optical disc.

BRIEF DESCRIPTION OF THE DRAWINGS

FIGS. 6A to 6F are diagrams for explaining operation of the optical information processing apparatus according to the first embodiment, i.e., the optical information processing method according to the first embodiment;

FIGS. 7A to 7E are diagrams for explaining operation of the optical information processing apparatus according to the first embodiment, i.e., the optical information processing method according to the first embodiment;

FIGS. 19A to 19F are diagrams for explaining operation of the optical information processing apparatus according to the third embodiment, i.e., the optical information processing method according to the third embodiment;

BEST MODE FOR CARRYING OUT THE INVENTION

First Embodiment

Figure 1:
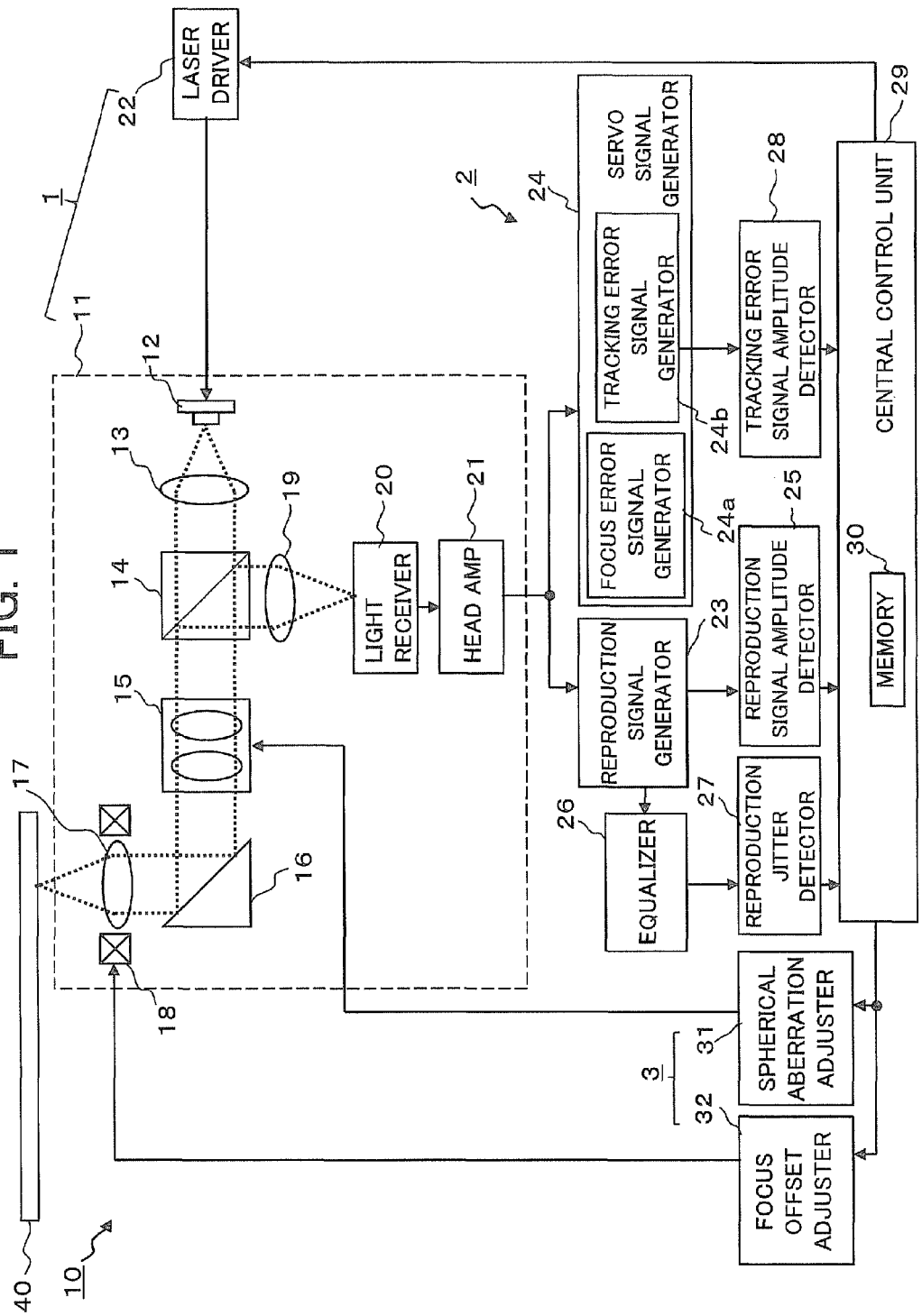
FIG. 1 is a diagram schematically illustrating a structure of an optical information processing apparatus according to a first embodiment (i.e., an apparatus capable of carrying out an optical information processing method according to the first embodiment) of the present invention.

FIG. 1 is a diagram schematically illustrating a structure of an optical information processing apparatus 10 according to a first embodiment (i.e., an apparatus capable of carrying out an optical information processing method according to the first embodiment) of the present invention. The optical information processing apparatus 10 according to the first embodiment is a component to be included in a recording/reproducing apparatus for recording and/or reproducing data on an information recording surface of an optical disc 40. The optical information processing apparatus 10 adjusts a spherical aberration and a focus offset, which vary depending on a thickness error and the like in a covering layer on the information recording surface of the optical disc during recording operation and during reproducing operation when the optical disc is mounted, for example. The adjustment is performed by reading a mark formed on the information recording surface of the optical disc by an optical pickup and adjusting the spherical aberration and the focus offset on the basis of a detection signal obtained at that time by the optical pickup. Further, the 'mark' means a recorded mark if the optical disc is a rewritable or recordable disc, and it means an information pit if the optical disc is a reproduction-only disc.

As illustrated in FIG. 1, the optical information processing apparatus 10 according to the first embodiment includes a light irradiating and receiving means 1 which has an optical pickup 11 and a laser driver 22; a signal processing means 2 for performing processing to a detection signal from the optical pickup 11 or processing on the basis of the detection signal; and an adjusting means 3 for causing the optical pickup 11 to adjust a spherical aberration and a focus offset on the basis of a signal generated and detected (measured) by the signal processing means 2. The optical pickup 11 in the light irradiating and receiving means 1 irradiates the information recording surface with laser light as a light collecting spot through the covering layer (not illustrated in the drawing) on the information recording surface (not illustrated in the drawing) on the optical disc 40, and detects reflected light from the information recording surface of the optical disc 40. From a detection signal of the reflected light by the optical pickup 11 in the light irradiating and receiving means 1, the signal processing means 2 detects shift amount of a first control device for controlling amount of a spherical aberration (SA) (hereinafter referred to as a 'SA amount control device') and shift amount of a second control device for controlling amount of a focus offset (FO) (hereinafter referred to as a 'FO amount control device'), generates a reproduction signal, and detects a performance evaluation value indicating characteristic (quality) of a reproduction signal. The adjusting means 3 sends spherical aberration and focus offset adjustment signals to the optical pickup 11 in the light irradiating and receiving means 1 on the basis of the shift amount of the SA amount control device, the shift amount of the FO amount control device and the performance evaluation value indicating characteristic of the reproduction signal from the signal processing means 2.

Here, the 'shift amount of the SA amount control device' is equivalent to shift amount of a spherical aberration adjusting element 15 by a mechanism (not illustrated in the drawing) movably supporting the spherical aberration adjusting element 15, for example, and the 'SA amount control device' is configured by a mechanism (not illustrated in the drawing) movably supporting the spherical aberration adjusting element 15 and the like, for example. However, the SA amount control device is not limited to such a configuration. The shift amount of the SA amount control device is shift amount for compensating a detected spherical aberration and is a value corresponding to the detected spherical aberration.

The 'shift amount of the FO amount control device' is equivalent to shift amount of the objective lens or other FO adjustment lens (not illustrated in the drawing) by a mechanism movably supporting the objective lens or the other FO adjustment lens (not illustrated in the drawing), for example, and the 'FO amount control device' is configured by the mechanism movably supporting the objective lens or the other FO adjustment lens (not illustrated in the drawing) and the like, for example. However, the FO amount control device is not limited to such a configuration. The shift amount of the FO amount control device is shift amount for compensating the detected focus offset and is a value corresponding to the detected focus offset.

As illustrated in FIG. 1, the optical pickup 11 includes a semiconductor laser 12 which is drive-controlled by the laser driver 22; a collimating lens 13; a splitter 14; the spherical aberration adjusting element 15; a total-reflection mirror 16; an objective lens 17; an objective lens actuator 18; a detection lens 19; a light receiver 20; and a head amp 21. During data reproduction, laser light emitted from the semiconductor laser 12 and having an output value (reproduction power) necessary for data reproduction is collected and irradiated onto the information recording surface of the optical disc 40, through the collimating lens 13, the splitter 14, the spherical aberration adjusting element 15, the total-reflection mirror 16 and the objective lens 17. The reflected light from the information recording surface of the optical disc 40 passes through the objective lens 17, the total-reflection mirror 16 and the spherical aberration adjusting element 15, then bended by the splitter 14, and is received through the detection lens 19 by the light receiver 20. The light receiver 20 has a plurality of light receiving surfaces and each of the light receiving surfaces converts a received optical signal to an electric signal to output it, for example.

Further, as illustrated in FIG. 1, the signal processing means 2 includes a reproduction signal generator 23; a servo signal generator 24; a reproduction signal amplitude detector 25; an equalizer 26; a reproduction jitter detector 27; a tracking error signal amplitude detector 28; a central control unit 29; and a memory 30. The servo signal generator 24 has a focus error signal generator 24a and a tracking error signal generator 24b. Although in FIG. 1, the memory unit 30 is provided inside of the central control unit 29, the memory unit 30 may be a component provided outside the central control unit 29. The electric signal generated by the conversion of the light receiver 20 is inputted to the reproduction signal generator 23 and the servo signal generator 24 through the head amp 21. The reproduction signal generator 23 generates a reproduction signal on the basis of a signal from the head amp 21, and outputs the generated reproduction signal to the reproduction signal amplitude detector 25 and the equalizer 26. The equalizer 26 shapes the inputted reproduction signal, thereby outputting it to the reproduction jitter detector 27. The reproduction jitter detector 27 detects a jitter value which is an indicator determined from the reproduction signal and an absolute value of a phase error between generated clocks by a PLL (Phase Locked Loop) which is not illustrated in the drawing. The focus error signal generator 24a and the tracking error signal generator 24b in the servo signal generator 24 generate a focus error signal and a tracking error signal respectively. The tracking error signal generated by the tracking error signal generator 24b is inputted to the tracking error signal amplitude detector 28. Amplitude information detected by the reproduction signal amplitude detector 25 and the tracking error signal amplitude detector 28 is supplied to the central control unit 29. The central control unit 29 determines a spherical aberration and a focus offset to be subsequently set on the basis of the received amplitude information and supplies the determined spherical aberration and focus offset values to a spherical aberration adjuster 31 and a focus offset adjuster 32 respectively. As a focus error signal generating method by the focus error signal generator 24a, a publicly known method may be used, for example, an astigmatism method, a knife-edge method, a spot size detection method or the like. As a tracking error signal generating method by the tracking error signal generator 24b, a publicly known method, for example, a push-pull method, a DPP (Differential Push-Pull) method, a DPD (Differential Phase Detection) method, or the like may be used.

Furthermore, as illustrated in FIG. 1, the adjusting means 3 has the spherical aberration adjuster 31 and the focus offset adjuster 32. The spherical aberration adjuster 31 adjusts a spherical aberration by driving the spherical aberration adjusting element 15 in the optical pickup 11. The focus offset adjuster 32 adjusts a focus offset by driving the objective lens actuator 18 for shifting the objective lens 17 in a focus direction or a tracking direction when a servo control is performed. In this example, the optical information processing apparatus 10 adjusts the spherical aberration and the focus offset which vary depending on a thickness error in the covering layer on the information recording surface of the optical disc and the like, during recording operation and during reproducing operation when the optical disc is mounted, however, timing at which the adjustment is performed is not limited.

Figure 2:
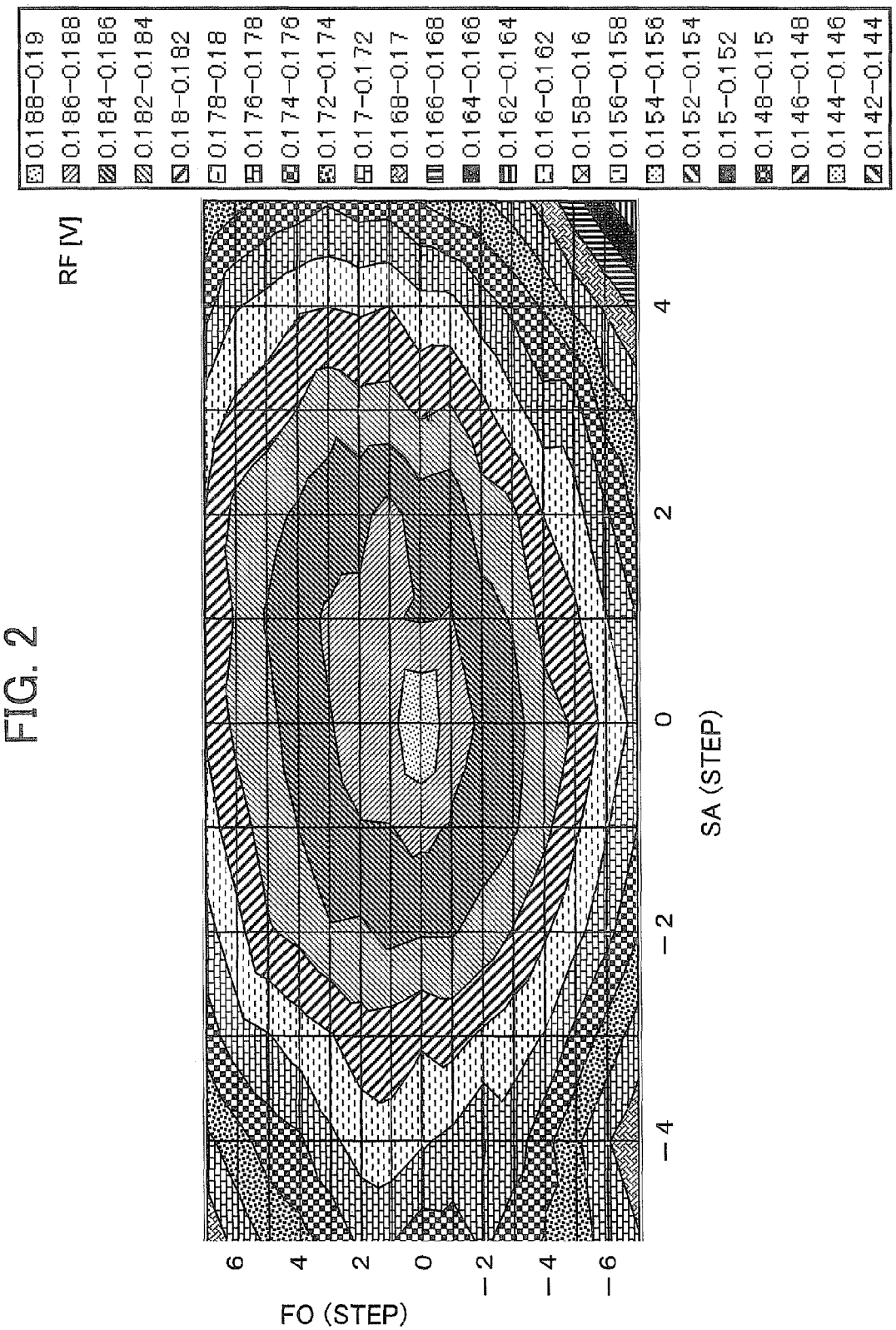
FIG. 2 is a diagram illustrating an example of a distribution of reproduction signal amplitude values in relation to a spherical aberration and a focus offset in an x and y coordinate system (a two-dimensional space)

FIG. 2 is a diagram illustrating an example of a distribution of reproduction signal amplitude values RF in relation to a spherical aberration and a focus offset in an x and y coordinate system where an x-coordinate is the spherical aberration and a y-coordinate is the focus offset (a two-dimensional plane). In FIG. 2, a horizontal or vertical scale (1 step) represents shift amount from an optimum spherical aberration SA or an optimum focus offset FO. As illustrated in FIG. 2, each of a plurality of concentric and elliptic areas represents a region of substantially the same reproduction signal amplitude value (i.e., an area within a certain range) in the x and y coordinate system whose coordinate axes represent a spherical aberration and a focus offset. It is understood from FIG. 2 that each of the plurality of concentric and elliptic areas represents a region of substantially the same reproduction signal amplitude value (i.e., an area within a certain range) and that an optimum value where the reproduction signal amplitude value is the largest is near a center point of the ellipse.

Figure 3:
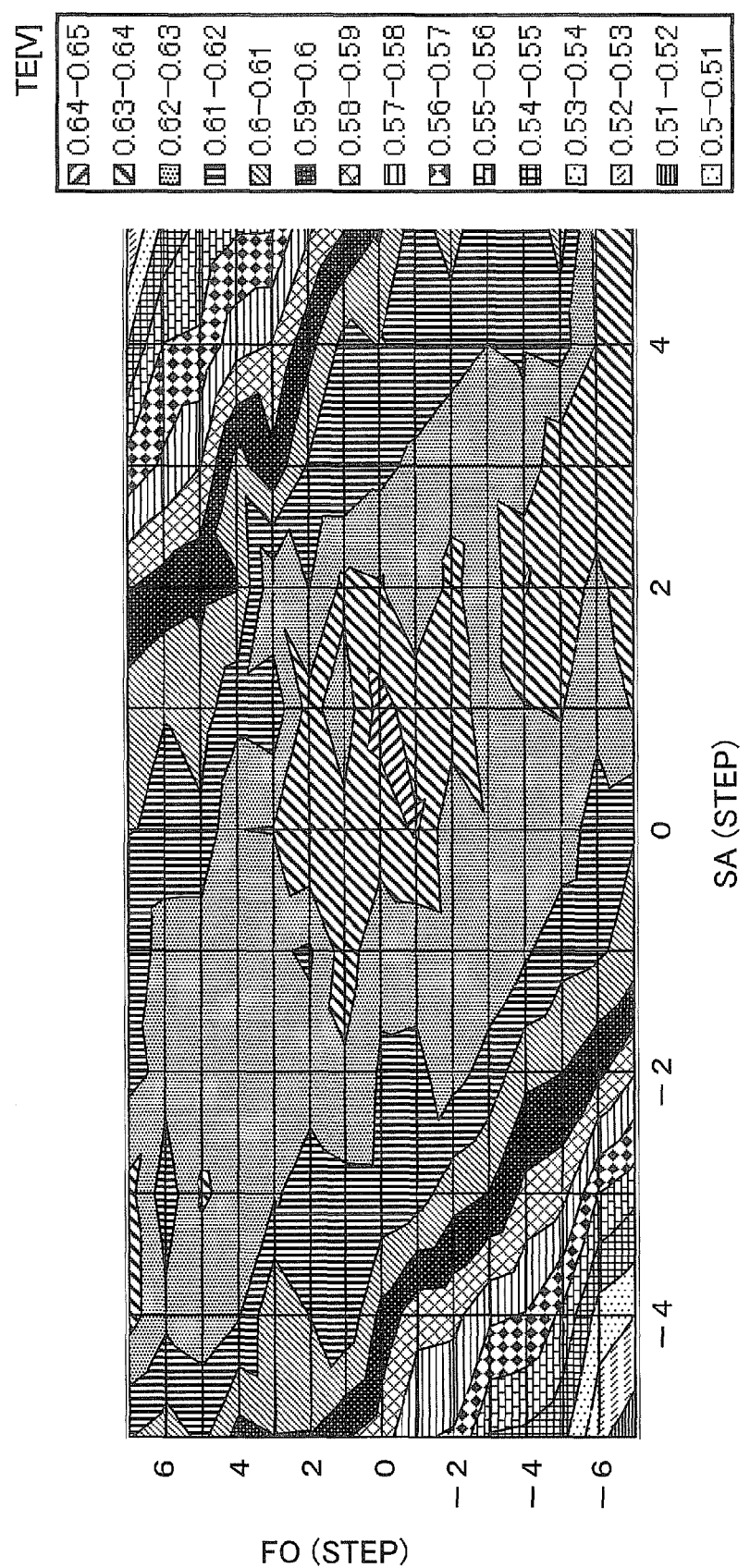
FIG. 3 is a diagram illustrating an example of a distribution of tracking error signal amplitude values in relation to a spherical aberration and a focus offset in an x and y coordinate system (a two-dimensional space)

FIG. 3 is a diagram illustrating an example of a distribution of tracking error signal amplitude values TE in relation to a spherical aberration and a focus offset in an x and y coordinate system (a two-dimensional plane) where an x-coordinate is the spherical aberration and a y-coordinate is the focus offset. In FIG. 3, a horizontal or vertical scale (1 step) represents shift amount from an optimum spherical aberration SA or a focus offset FO. As illustrated in FIG. 3, each region having substantially the same tracking error signal amplitude value (i.e., a region within a certain range) is a belt-shaped (linear) region extending from upper left to lower right in the x and y coordinate system where coordinate axes represent the spherical aberration and the focus offset respectively. It is understood from FIG. 3 that a locus on which the tracking error signal has the same amplitude value can be approximated by a straight line extending substantially from the upper left to the lower right (right downward) in the x and y coordinate system.

Figure 4:
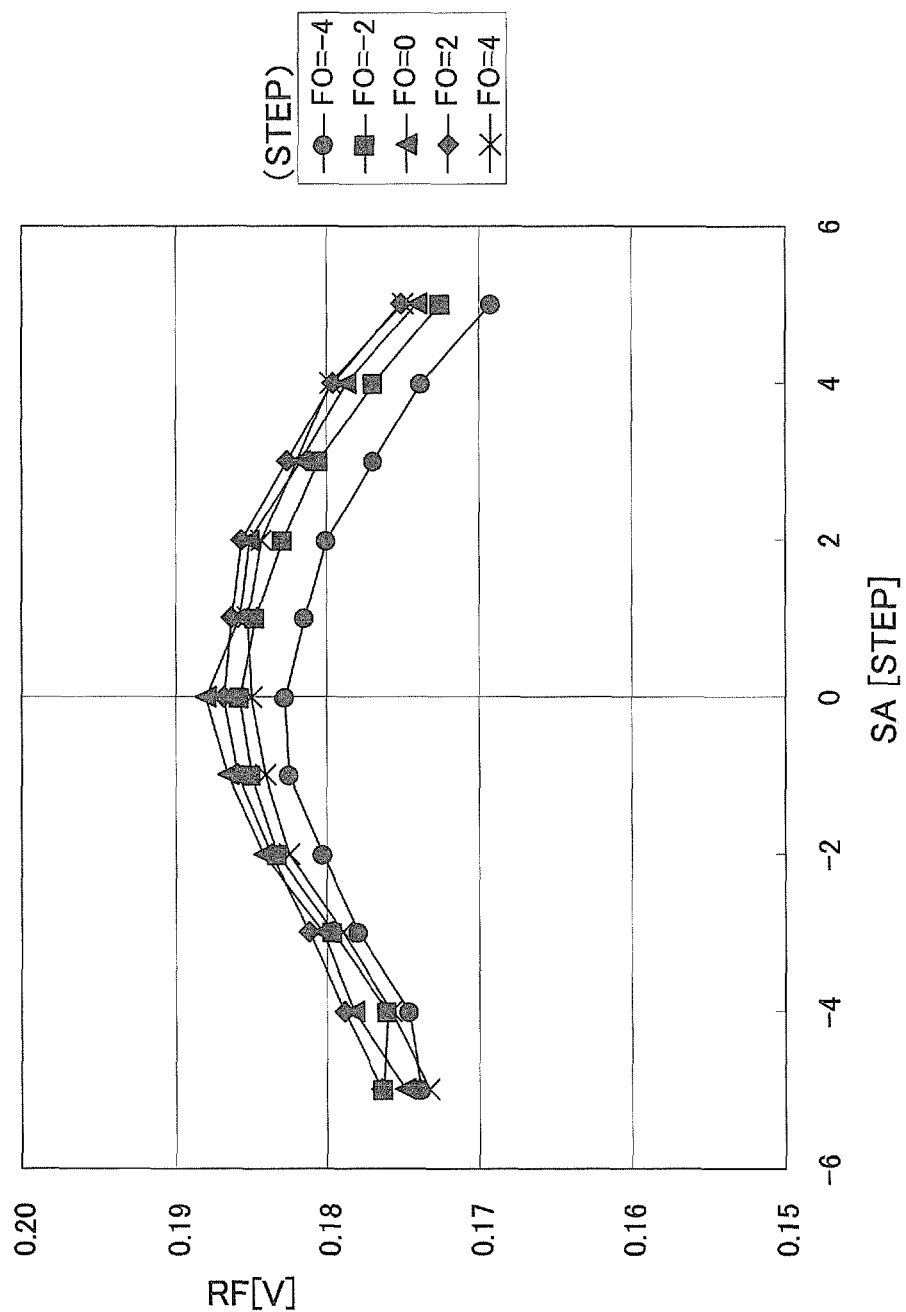
FIG. 4 is a graph illustrating an example of reproduction signal amplitude values versus spherical aberrations when a focus offset is constant.

FIG. 4 is a graph illustrating an example of the reproduction signal amplitude values RF versus the spherical aberrations SA when the focus offset FO has a certain value. It is understood from FIG. 4 that the reproduction signal amplitude value RF has a curved distribution which is similar to a quadratic curve in an x and z coordinate system where a z-coordinate is a reproduction signal amplitude value RF [V] and an x-coordinate is the spherical aberration SA. Thus, the amplitude value of the reproduction signal RF can be approximately represented by a quadratic curve of the spherical aberration SA in the x and z coordinate system, i.e., the amplitude value of the reproduction signal RF can be approximately given by the following quadratic function equation (a quadratic approximation curve):

$$z = a_1 x^2 + b_1 \cdot x + c_1 \qquad \text{equation (1)}$$

where the z-coordinate is the reproduction signal amplitude value RF which is an example of a reproduction signal performance evaluation value, the x-coordinate is the spherical aberration SA, and $a_1$, $a_1$, $b_1$ and $c_1$ are constants. As the reproduction signal performance evaluation value, a reproduction signal jitter value or an error rate may be used in place of the reproduction signal amplitude value, the reproduction signal jitter value or the error rate also can be approximately represented by a quadratic approximation curve of the spherical aberration SA.

Figure 5:
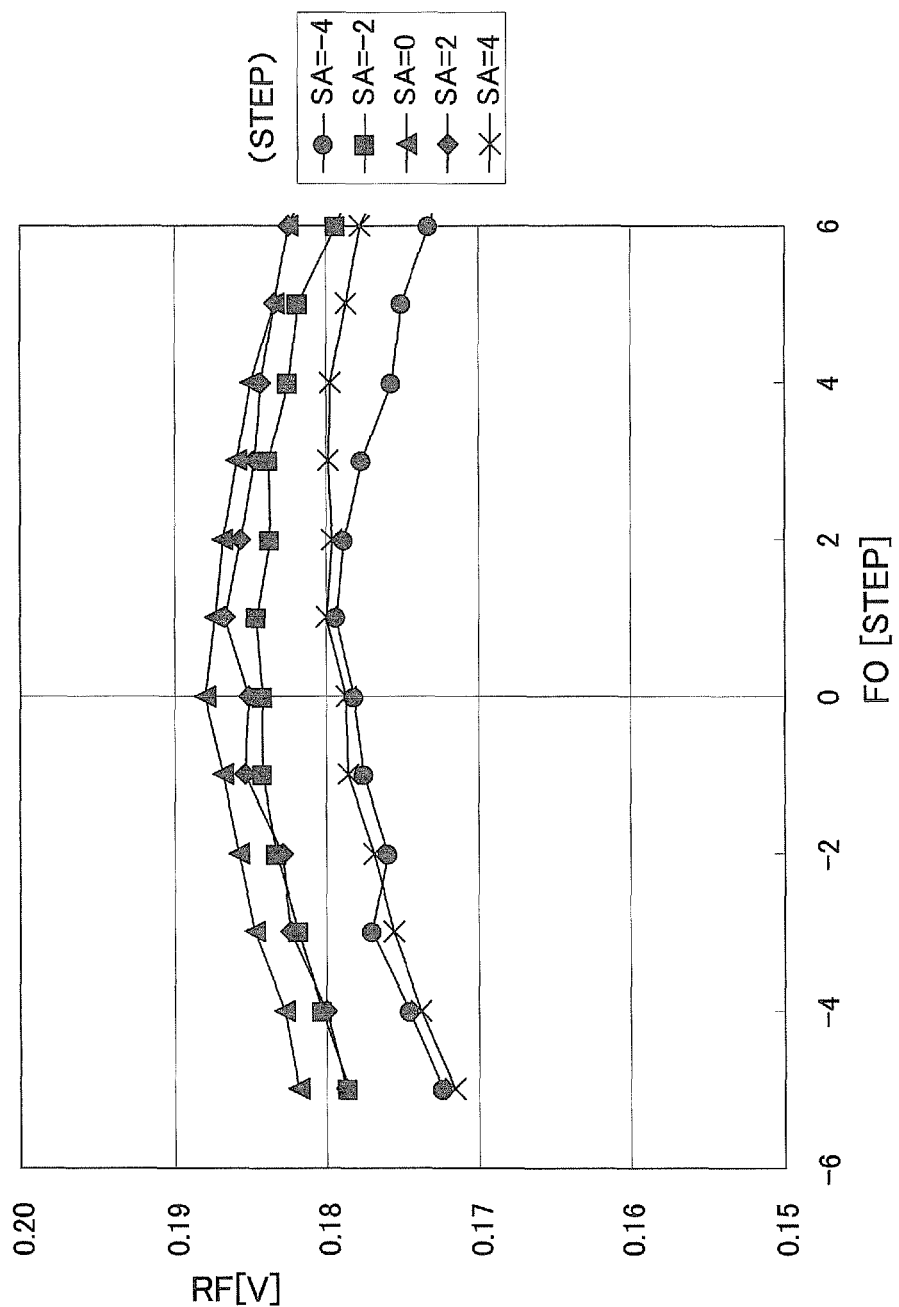
FIG. 5 is a graph illustrating an example of reproduction signal amplitude values versus a focus offset when a spherical aberration is constant.

FIG. 5 is a graph illustrating an example of the reproduction signal amplitude values RF versus the focus offsets FO when the spherical aberration SA has a certain value. It is understood from FIG. 5 that the reproduction signal amplitude value RF has a curved distribution which is similar to a quadratic curve in an x and z coordinate system where a z-coordinate is the reproduction signal amplitude value RF [V] and an x-coordinate is the focus offset FO. Thus, the reproduction signal amplitude value RF can be approximately represented by a quadratic curve of the focus offset FO in the x and z coordinate system, i.e., the reproduction signal amplitude value RF can be approximately given by the following quadratic function equation (a quadratic approximation curve):

$$z = a_2 x^2 + b_2 \cdot x + c_2 \qquad \text{equation (2)}$$

where 'z' is the reproduction signal amplitude value RF which is an example of the reproduction signal performance evaluation value, 'x' is the focus offset FO, and $a_2$, $b_2$ and $c_2$ are constants. As the reproduction signal performance evaluation value, a reproduction signal jitter value or an error rate may be used in place'of the reproduction signal amplitude value, the reproduction signal jitter value or the error rate also can be approximately represented by a quadratic approximation curve of the focus offset FO.

In the operation of the optical information processing apparatus 10, i.e., in the optical information processing method, ratios $r_1$ (=$a_1/a_2$) and $r_2$ (=$a_2/a_1$) which are ratios between $a_1$ and $a_2$ in the equations (1) and (2), are determined in advance.

FIGS. 6A to 6F, FIGS. 7A to 7E and FIGS. 8A to 8D are diagrams for explaining operation of the optical information processing apparatus 10 according to the first embodiment, i.e., the optical information processing method according to the first embodiment, where an x-coordinate (a horizontal axis) is shift amount of the SA amount control device, and a y-coordinate (a vertical axis) is shift amount of the FO amount control device corresponding to the focus offset. Another case where an x-coordinate (a horizontal axis) is shift amount of the FO amount control device and a y-coordinate (a vertical axis) is shift amount of the SA amount control device will be described in a third embodiment.

The optical information processing method according to the first embodiment includes a step in which the light irradiating and receiving means 1 irradiates the information recording surface of the optical disc 40 with laser light as the light collecting spot and detects reflected light from the information recording surface of the optical disc 40; a step in which the signal processing means 2 detects shift amount of the SA amount control device and shift amount of the FO amount control device, from a reflected light detection signal outputted from the light irradiating and receiving means 1, generates a reproduction signal and detects a performance evaluation value indicating characteristic of the reproduction signal; and a step in which the adjusting means 3 causes the light irradiating and receiving means 1 to perform adjustment on the basis of the shift amount of the SA amount control device, the shift amount of the FO amount control device and the performance evaluation value. The performance evaluation value indicating characteristic of the reproduction signal is any of an amplitude value of the reproduction signal, a reproduction jitter value of the reproduction signal and an error rate of the reproduction signal, for example.

If the information recording surface of the optical disc 40 has a mark as recorded information, the step in which the light irradiating and receiving means 1 detects the reflected light from the information recording surface of the optical disc 40 is performed by irradiating the mark with information-reading laser light. If the information recording surface of the optical disc 40 has no mark as recorded information, the step in which the light irradiating and receiving means 1 detects the reflected light from the information recording surface of the optical disc 40 is performed by irradiating a predetermined position on the information recording surface of the optical disc 40 with information-recording laser light in order to record a mark and irradiating the recorded mark with information-reading laser light. A mark recorded in a data area or a test area on the information recording surface of the optical disc may be used as the mark at this time.

With reference to FIGS. 6A to 6F, processing of the signal processing means 2 in the optical information processing apparatus 10 will be explained below. First, the optical pickup 11 detects the reflected light when the information-reading laser light is irradiated onto the mark as recorded information on the information recording surface of the optical disc 40. As illustrated in FIG. 6A, on the basis of a detection signal from the optical pickup 11, the signal processing means 2 detects a first performance evaluation value Az indicating characteristic of the reproduction signal at a first point 'A' (i.e., a point of coordinates (Ax, Ay)) where an x-coordinate is shift amount Ax of the spherical aberration (initial spherical aberration) amount control device and a y-coordinate is shift amount Ay of the FO amount control device in an x and y coordinate system. The performance evaluation value is any of an amplitude value of the reproduction signal, a reproduction jitter value of the reproduction signal and an error rate of the reproduction signal, for example, as has been already described.

Next, as illustrated in FIG. 6B, the signal processing means 2 sets a second point 'B' (i.e., a point of coordinates (Bx, By)) where an x-coordinate is Bx which is different from Ax and a y-coordinate is By which is equal to Ay in an x and y coordinate system, and detects a second performance evaluation value Bz indicating characteristic of the reproduction signal at the second point 'B'. As described in FIG. 6B, the signal processing means 2 sets a third point 'C' (i.e., a point of coordinates (Cx, Cy)) where an x-coordinate is Cx which is different from both of Ax and Bx and a y-coordinate is Cy which is equal to Ay in the x and y coordinate system, and detects a third performance evaluation value Cz indicating characteristic of the reproduction signal at the third point 'C'. In the adjusting means 3, distances of the second point 'B' and the third point 'C' from the first point 'A' may not be limited, as long as tracking error signal amplitude values at the second point 'B' and the third point 'C' are equal to or exceed a reference value stored in advance in the memory 30. Thus, each of the second point 'B' and the third point 'C' is preferably set so that the tracking error signal amplitude value is not less than the reference value stored in advance in the memory 30.

Next, the signal processing means 2 calculates a quadratic approximation curve which approximately represents a reproduction signal performance evaluation value 'z' by a quadratic function of a spherical aberration 'x'. The quadratic approximation curve of the performance evaluation value is a curve similar to the curve illustrated in FIG. 4 and approximately represents a curve indicated by data in FIG. 4. For calculating the quadratic approximation curve, the signal processing means 2 calculates the constants $a_1$, $b_1$ and $c_1$ in the equation (1), on the basis of a first evaluation point, a second evaluation point and a third evaluation point: the first evaluation point where an x-coordinate is Ax and a z-coordinate is the first performance evaluation value Az in an x and z coordinate system (coordinates (Ax, Az) in the x and z coordinate system), the second evaluation point where an x-coordinate is Bx and a z-coordinate is the second performance evaluation value Bz in the x and z coordinate system (coordinates (Bx, Bz) in the x and z coordinate system), and the third evaluation point where an x-coordinate is Cx and a z-coordinate is the third performance evaluation value Cz in the x and z coordinate system (coordinates (Cx, Cz) in the x and z coordinate system not illustrated in the drawing), and determines a quadratic approximation curve which approximately represents the performance evaluation value 'z' by a quadratic function of the spherical aberration 'x'.

Next, as illustrated in FIG. 6C, the signal processing means 2 sets a fourth point 'D' where an x-coordinate is Dx and a y-coordinate is Dy (i.e., a point of coordinates (Dx, Dy)) in an x and y coordinate system on a first straight line 'L' which has a slope set in advance and passes through the first point 'A', and detects a fourth performance evaluation value Dz indicating characteristic of the reproduction signal at the fourth point 'D'. The fourth point 'D' differs from the first point 'A'. It is preferable that the first straight line 'L' be a locus on which the tracking error signal has the same amplitude value in the x and y coordinate system. Here, the locus on which the tracking error signal has the same amplitude value is a region where tracking error signal amplitude values are within a predetermined range and can be considered to be substantially the same to each other (the right-downward band-shaped and linear regions in FIG. 3, for example). If the fourth point 'D' is set on the first straight line 'L', a tracking error signal amplitude value at the first point 'A' and a tracking error signal amplitude value at the fourth point 'D' are the same, and so the point 'D' may be fairly distant from the point 'A' as long as on the first straight line 'L'. However, the fourth point 'D' is set in a position where a quadratic approximation curve of the performance evaluation value has two real roots which indicate the x-coordinates of the fourth performance evaluation value Dz. That is to say, if the performance evaluation value is the reproduction signal amplitude value, the fourth point 'D' is set so that the performance evaluation value Dz is less than a maximum value of the quadratic curve represented by the quadratic approximation curve of the performance evaluation value. If the performance evaluation value is the reproduction signal jitter value or error rate, the fourth point 'D' is set so that the performance evaluation value Dz is larger than a minimum value of the quadratic curve represented by the quadratic approximation curve of the performance evaluation value.

Next, as illustrated in FIG. 6D, the signal processing means 2 sets a fifth point 'E' in an x and y coordinate system where an x-coordinate is Ex calculated from a fifth performance evaluation value Ez which is equal to the fourth performance evaluation value Dz by using a quadratic approximation curve of a performance evaluation value and a y-coordinate is Ey which is equal to Ay (i.e., a point of coordinates (Ex, Ey)). As illustrated in FIG. 6D, the signal processing means 2 sets a sixth point 'F' (i.e., a point of coordinates (Fx, Fy)) in the x and y coordinate system where an x-coordinate is Fx, which is different from Ex, calculated from a sixth performance evaluation value Fz which is equal to the fourth performance evaluation value Dz by using a quadratic approximation curve and a y-coordinate is Fy which is equal to Ay.

Next, as illustrated in FIG. 6E, the signal processing means 2 sets a ninth point 'J' (i.e., a point of coordinates (Jx, Jy)) where an x-coordinate is Jx which is equal to Dx and a y-coordinate is Jy which is equal to Ay in the x and y coordinate system. The signal processing means 2 calculates a ninth performance evaluation value Jz indicating characteristic of the reproduction signal at the ninth point 'J' on the basis of a quadratic curve calculated on the basis of the coordinates (Ax, Az), (Bx, Bz) and (Cx, Cz) in the x and z coordinate system.

Next, as illustrated in FIG. 6E, the signal processing means 2 sets a seventh point 'G' (i.e., a point of coordinates (Gx, Gy)) where an x-coordinate is Gx which is equal to Dx and a y-coordinate is Gy in the x and y coordinate system so as to be equal to the fourth performance evaluation value Dz, on the basis of the ratio $r_1$ (=$a_1/a_2$) between $a_1$ and $a_2$ in the equations (1) and (2) and the ninth performance evaluation value Jz indicating characteristic of the reproduction signal at the ninth point 'J'.

Next, as illustrated in FIG. 6F, the signal processing means 2 calculates an ellipse 50 which passes through the fourth point 'D', the fifth point 'E', the sixth point 'F' and the seventh point 'G', and calculates an eighth point 'H' (i.e., a point of coordinates (Hx, Hy)) which is a center point of the ellipse 50 in the x and y coordinate system. Then, as illustrated in FIG. 6F, the adjusting means 3 causes the optical pickup 11 to perform adjustment so that a point in the x and y coordinate system determined depending on shift amount of the SA amount control device and shift amount of the FO amount control device shifts from the first point 'A' to the eight point 'H'. And thus the adjusting routine of the spherical aberration and the focus offset illustrated in FIGS. 6A to 6F is terminated.

FIGS. 6A to 6F show an example of the adjusting routine which utilizes that each of the plurality of concentric and elliptic areas indicates a region of the same performance evaluation value in the x and y coordinate system whose coordinate axes represent a spherical aberration and a focus offset as illustrated in FIG. 2, and it is considered that adjustment to the center point 'H' of the ellipse is sufficient. Instead, by using the ratio $r_1$ (=$a_1/a_2$) between $a_1$ and $a_2$ in the equations (1) and (2), another spherical aberration x' may be obtained by multiplying the spherical aberration 'x' by $r_1^{1/2}$, as illustrated in FIGS. 7A to 7E. Thereby, in an x' and y coordinate system whose coordinate axes represent a spherical aberration and a focus offset respectively, each of the plurality of concentric areas represents a region of the same performance evaluation value.

With reference to FIGS. 7A to 7E, processing of the signal processing means 2 in the optical information processing apparatus 10 will be schematically explained below. Since FIGS. 7A to 7D correspond to FIGS. 6A to 6D which have been already described, and therefore their explanation will be omitted from the following description. Namely, points A0, B0, C0, D0, E0, F0 and a straight line L0 in FIGS. 7A to 7D are approximately the same as the first point 'A', the second point 'B', the third point 'C', the fourth point 'D', the fifth point 'E', the sixth point 'F' and the straight line 'L' in FIGS. 6A to 6D, respectively.

As illustrated in FIG. 7E, the signal processing means 2 calculates a circle 51 which passes through the fourth point D0, the fifth point E0, the sixth point F0 and calculates an eighth point H0 (i.e., a point of coordinates (H0x', H0y)) which is a center point of the circle 51 in an x' and y coordinate system. Then, as illustrated in FIG. 7E, the adjusting means 3 causes the optical pickup 11 to perform adjustment so that a point in an x' and y coordinate system determined depending on shift amount of the SA amount control device and shift amount of the FO amount control device shifts from the first point A0 to the eighth point H0. And thus the adjusting routine of the spherical aberration and the focus offset illustrated in FIGS. 7A to 7E is terminated.

FIGS. 6A to 6E illustrate the calculation of the ellipse 50 which passes through the fourth point 'D', the fifth point 'E', the sixth point 'F' and the seventh point 'G', and the calculation of the eighth point 'H' in an x and y coordinate system which is a center point of the ellipse 50, i.e., the determination of an optimum point of a spherical aberration and a focus offset; and FIGS. 7A to 7E illustrate the calculation of the circle 51 which passes through the fourth point D0, the fifth point E0 and the sixth point F0, and the calculation of the eighth point H0 in an x' and y coordinate system which is a center point of the circle 51, i.e., the determination of an optimum point of a spherical aberration and a focus offset. Instead, as illustrated in FIGS. 8A to 8D, an optimum point of a spherical aberration and a focus offset may be independently determined by using a fact that the reproduction signal amplitude value RF is approximately represented by quadratic curves in relation to the spherical aberration SA and the focus offset FO in FIG. 4 and FIG. 5.

Figure 8A:
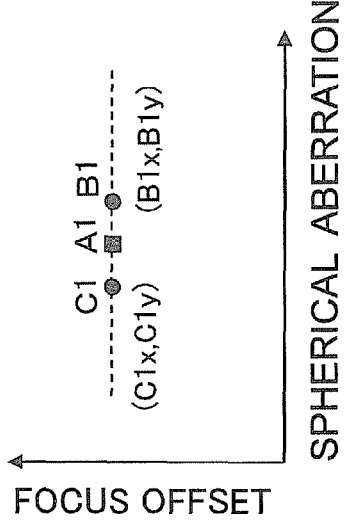
FIGS. 8A to 8D are diagrams for explaining operation of the optical information processing apparatus according to the first embodiment, i.e., the optical information processing method according to the first embodiment.
Figure 8B:
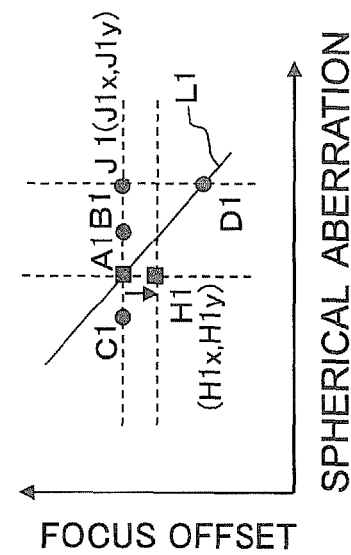

With reference to FIGS. 8A to 8D, processing of the signal processing means 2 in the optical information processing apparatus 10 will be schematically explained below. FIGS. 8A to 8B correspond to FIGS. 6A to 6B which have been already described, and therefore their explanation will be omitted from the following description. Namely, points A1, B1, C1, D1 and a straight line L1 in FIGS. 8A to 8B are approximately the same as the first point 'A', the second point 'B', the third point 'C', the fourth point 'D' and the straight line 'L' in FIGS. 6A to 6B respectively.

Figure 8C:
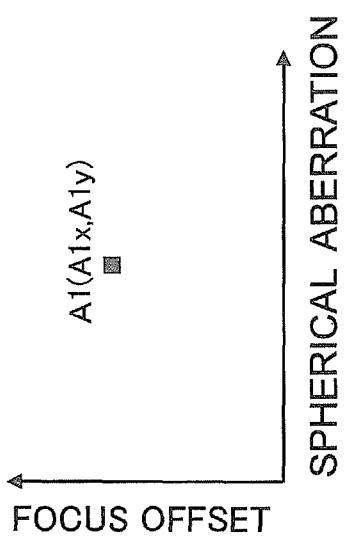

As illustrated in FIG. 8C, the signal processing means 2 calculates the constants $a_1$, $b_1$ and $c_1$ in the equation (1) on the basis of the first evaluation point, the second evaluation point and the third evaluation point: the first evaluation point (coordinates (A1x, A1z) in the x and z coordinate system) where an x-coordinate is A1x and a z-coordinate is a first performance evaluation value A1z in an x and z coordinate system, the second evaluation point (coordinates (B1x, B1z) in the x and z coordinate system) where an x-coordinate is B1x and a z-coordinate is a second performance evaluation value B1z in the x and z coordinate system, and the third evaluation point (coordinates (C1x, C1z) in the x and z coordinate system, not illustrated in the drawing) where an x-coordinate is C1x and a z-coordinate is a third performance evaluation value C1z in the x and z coordinate system. The signal processing means 2 calculates a value of 'x' which has an extremum in a quadratic approximation curve with respect to 'x', i.e., a maximum value of 'x' when a performance evaluation value is a reproduction signal amplitude value. The value of 'x' at this time is denoted by H1x.

Next, as illustrated in FIG. 8C, the signal processing means 2 sets the fourth point D1 (i.e., a point of coordinates (D1x, D1y)) where an x-coordinate is D1x and a y-coordinate is D1y on the first straight line L1 which has a slope set in advance in an x and y coordinate system and passes through the first point 'A' and calculates a fourth performance evaluation value D1z indicating characteristic of the reproduction signal at the fourth point D1.

Figure 8D:
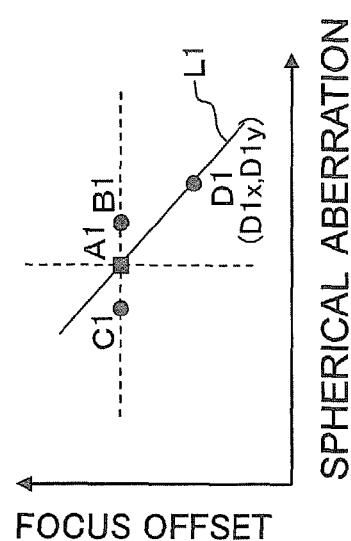

Next, as illustrated in FIG. 8D, the signal processing means 2 sets a ninth point J1 (i.e., a point of coordinates (J1x, J1y)) where an x-coordinate is J1x which is equal to D1x and a y-coordinate is J1y which is equal to A1y in the x and y coordinate system, and calculates a ninth performance evaluation value J1z indicating characteristic of the reproduction signal at the ninth point J1 on the basis of the quadratic curve calculated from the coordinates (A1x, A1z), (B1x, B1z) and (C1x, C1z) in the x and z coordinate system.

Next, as illustrated in FIG. 8D, the signal processing means 2 calculates the constants $a_2$, $b_2$ and $c_2$ in the equation (1) on the basis of $a_1$ in the equation (1), the ratio $r_1 (=a_1/a_2)$ between $a_1$ and $a_2$ in the equations (1) and (2) which is determined in advance, the fourth performance evaluation value D1z indicating characteristic of the reproduction signal at the fourth point D1 and the ninth performance evaluation value J1z indicating characteristic of the reproduction signal at the ninth point J1 which are calculated on the basis of the coordinates (A1x, A1z), (S1x, B1z) and (C1x, C1z) in the x and y coordinate system. The signal processing means 2 calculates a value of 'y' which has an extremum in a quadratic approximation curve with respect to 'y', i.e., a maximum value of 'y' when a performance evaluation value is a reproduction signal amplitude value. The value of 'y' at this time is denoted by H1y.

Next, as illustrated in FIG. 8D, the adjusting means 3 causes the optical pickup 11 to perform adjustment so that a point determined depending on shift amount of the SA amount control device and shift amount of the F0 amount control device in an x and y coordinate system shifts from the first point A1 to the eighth point H1 (a point where an x-coordinate is H1x and a y-coordinate is H1y in an x and y coordinate system). And thus the adjusting routine of the spherical aberration and the focus offset illustrated in FIGS. 8A to 8D is terminated.

Next, with reference to FIG. 9 to FIG. 16, operation of the optical information processing apparatus 10 according to the first embodiment (the optical information processing method) will be explained in more detail.

Figure 9:
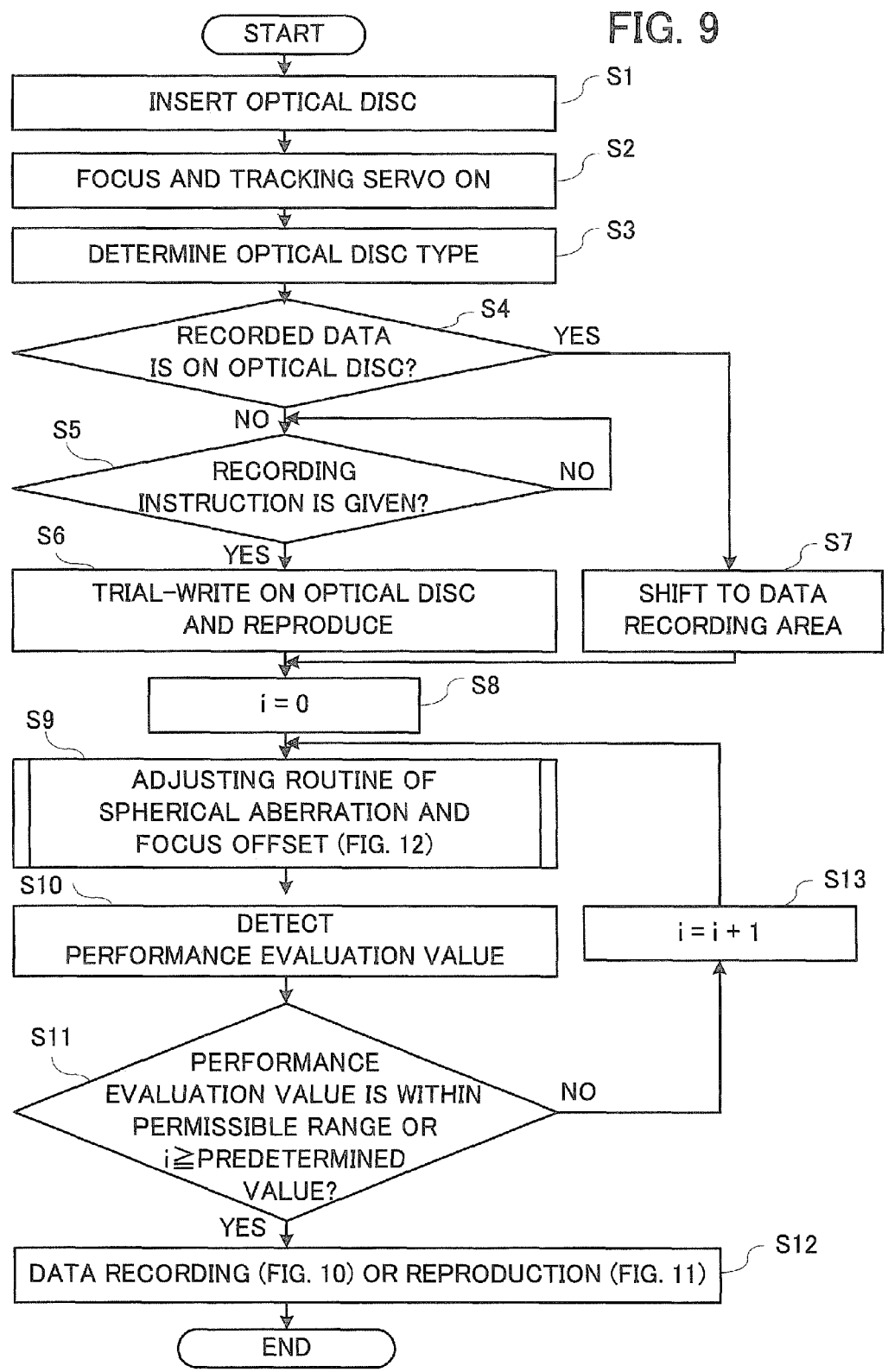
FIG. 9 is a flowchart illustrating an example of processing from insertion of an optical disc to data recording or data reproduction in the optical information processing apparatus according to the first embodiment.

FIG. 9 is a flowchart illustrating processing from insertion of an optical disc to data recording or data reproduction in the optical information processing apparatus 10 according to the first embodiment. As illustrated in FIG. 9, when the optical disc 40 to be recorded or reproduced is inserted into the optical information processing apparatus 10 (step S1), the signal processing means 2 turns on focus servo and tracking servo(the servo signal generator 24, the objective lens actuator 18 and the like) (step S2). Then, a means, not illustrated in the drawing, which is included in the light irradiating and receiving means 1 determines a type of the optical disc (step S3). The determination of the type of the optical disc includes a step of determining whether the optical disc is a BD, a DVD or a CD and a step of determining whether the optical disc is rewritable type, recordable type or reproduction-only type, for example. The way of determining a type of the inserted optical disc is publicly known and any way is available.

Next, the central control unit 29 in the signal processing means 2 determines whether or not there is recorded data on the information recording surface of the optical disc 40 on the basis of a signal from the light irradiating and receiving means 1 (e.g., the optical pickup 11, a mark detection sensor which is not illustrated in the drawing, or the like) (step S4). If it is determined that there is no recorded data (not yet recorded), the central control unit 29 in the signal processing means 2 sends an instruction to the light irradiating and receiving means 1 via a means (an interface) not illustrated in the drawing to perform data recording operation on the optical disc 40, i.e., a trial writing on the information recording surface of the optical disc 40 (step S6), then causes the light irradiating and receiving means 1 to reproduce from an area where the trial writing has been performed (step S6). If there is recorded data on the information recording surface of the optical disc 40 in the step S4, the central control unit 29 in the signal processing means 2 causes the light irradiating and receiving means 1 to shift a data reading position on the optical disc 40 to the data recording area and causes to perform reproduction (step S7). At this time, it is desirable to shift the data reading position to a position in the data recording area closest to the data reading position on the optical disc 40 immediately before performing the determination whether or not there is the record on the optical disc 40 (step S4). It is because time for shifting the data reading position (i.e., time for shifting to the data recording area) is made to be shortest before performing the step S4.

Next, the central control unit 29 in the signal processing means 2 initializes a variable 'i' to zero (step S8). The symbol 'i' denotes number of times of adjusting a spherical aberration and a focus offset in the spherical aberration and focus offset adjusting routine (step S9) described below and is stored in the memory 30. Then, the adjusting means 3 causes the spherical aberration adjusting element 15 in the optical pickup 11 and the objective lens actuator 18 to adjust a spherical aberration and a focus offset (step S9). The spherical aberration and focus offset adjusting routine (step S9) is processing performed by the optical pickup 11, the reproduction signal generator 23, the reproduction signal amplitude detector 25, the equalizer 26, the reproduction jitter detector 27, the tracking error signal amplitude detector 28, the central control unit 29 and the like, and details of the adjusting method will be explained below referring to flowcharts in FIG. 12 to FIG. 15.

Next, the signal processing means 2 (e.g., the reproduction jitter detector 27 and the central control unit 29, and the like) measures a reproduction signal performance evaluation value (step S10) to store it in the memory 30. The reproduction signal performance evaluation value is a reproduction signal amplitude value, a reproduction jitter value of the reproduction signal, an error rate of the reproduction signal or the like, for example, however, it may also be another value which can be an indicator of the reproduction signal quality.

Next, the central control unit 29 in the signal processing means 2 determines whether the reproduction signal performance evaluation value is within a permissible range or not and whether 'i' is not less than a predetermined value (step S11). If the reproduction signal performance evaluation value is within the permissible range or 'i' is not less than the predetermined value, the light irradiating and receiving means 1 is caused to start data recording/reproduction on the optical disc 40 (step S12). If the reproduction signal performance evaluation value is without the permissible range and 'i' is less than the predetermined value in the step S11, the central control unit 29 in the signal processing means 2 increments 'i' by one (step S13) and performs processing from the step S9 again. If 'i' is not less than the predetermined value and the reproduction signal performance evaluation value is not within the permissible range in the step S11, the central control unit 29 in the signal processing means 2 may adopt an optimum value out of performance evaluation values, number of which is number of the adjustments of a spherical aberration and a focus offset (the largest one in a case of a reproduction signal amplitude value, a smallest one in a case of a jitter value of the reproduction signal, and a smallest one in a case of an error rate of the reproduction signal).

Figure 10:
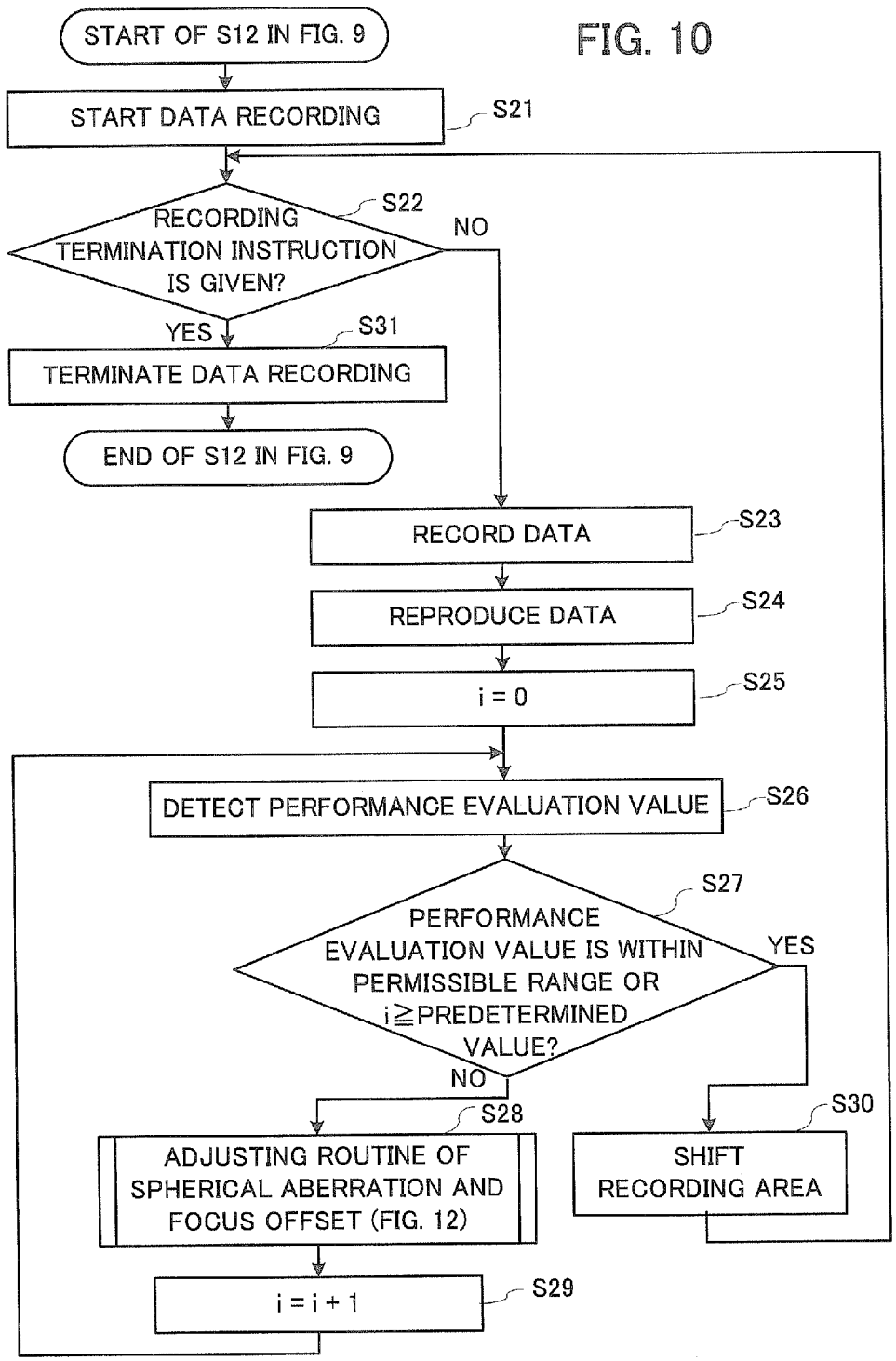
FIG. 10 is a flowchart illustrating an example of processing from data recording start to data recording completion in the optical information processing apparatus according to the first embodiment.

FIG. 10 is a flowchart illustrating an example of processing from data recording start to data recording completion in the optical information processing apparatus 10 according to the first embodiment. The processing in FIG. 10 is an example of the recording processing in the step S12 in FIG. 9.

As illustrated in FIG. 10, when the optical information processing apparatus 10 starts data recording on the optical disc 40 (step S21), the central control unit 29 in the signal processing means 2 determines whether a recording termination instruction (an input instruction from a means (an interface) not illustrated in the drawing) is given or not (step S22). If it is determined that the recording termination instruction is given in the step S22, the central control unit 29 in the signal processing means 2 terminates the data recording operation (step S31).

If the recording termination instruction is not given in the step S22, the central control unit 29 in the signal processing means 2 causes the light irradiating and receiving means 1, via the means not illustrated in the drawing, to perform the data recording operation on the optical disc 40 (step S23) and reproduce the recorded data (step S24).

Next, the central control unit 29 in the signal processing means 2 initializes the variable 'i' to zero (step S25) and measures the reproduction signal performance evaluation value (step S26) to store it in the memory 30.

Next, the central control unit 29 in the signal processing means 2 determines whether the reproduction signal performance evaluation value is within a permissible range or not and whether 'i' is not less than a predetermined value (step S27). If the reproduction signal performance evaluation value is within the permissible range or 'i' is not less than the predetermined value, the central control unit 29 in the signal processing means 2 causes the light irradiating and receiving means 1 to shift the recording area (step S30) and the light irradiating and receiving means 1 to start data recording on the optical disc 40 (step S22 and the subsequent steps). If the reproduction signal performance evaluation value is without the permissible range and 'i' is less than the predetermined value in the step S27, the central control unit 29 in the signal processing means 2 outputs a control signal to the adjusting means 3 to adjust a spherical aberration and a focus offset by the spherical aberration adjusting element 15 and the objective lens actuator 18 (step S28), increments 'i' by one (step S29) and performs the processing of step S26 and the subsequent processing again. If 'i' is equal to the predetermined value and the reproduction signal performance evaluation value is not less than the predetermined value and the performance evaluation value of the reproduction signal more than the predetermined value in the step S27, the central control unit 29 in the signal processing means 2 also may adopt an optimum value out of performance evaluation values, number of which is number of the adjustments of a spherical aberration and a focus offset. The adjusting method in the step S28 will be explained below in detail referring to flowcharts in FIG. 12 to FIG. 15.

Figure 11:
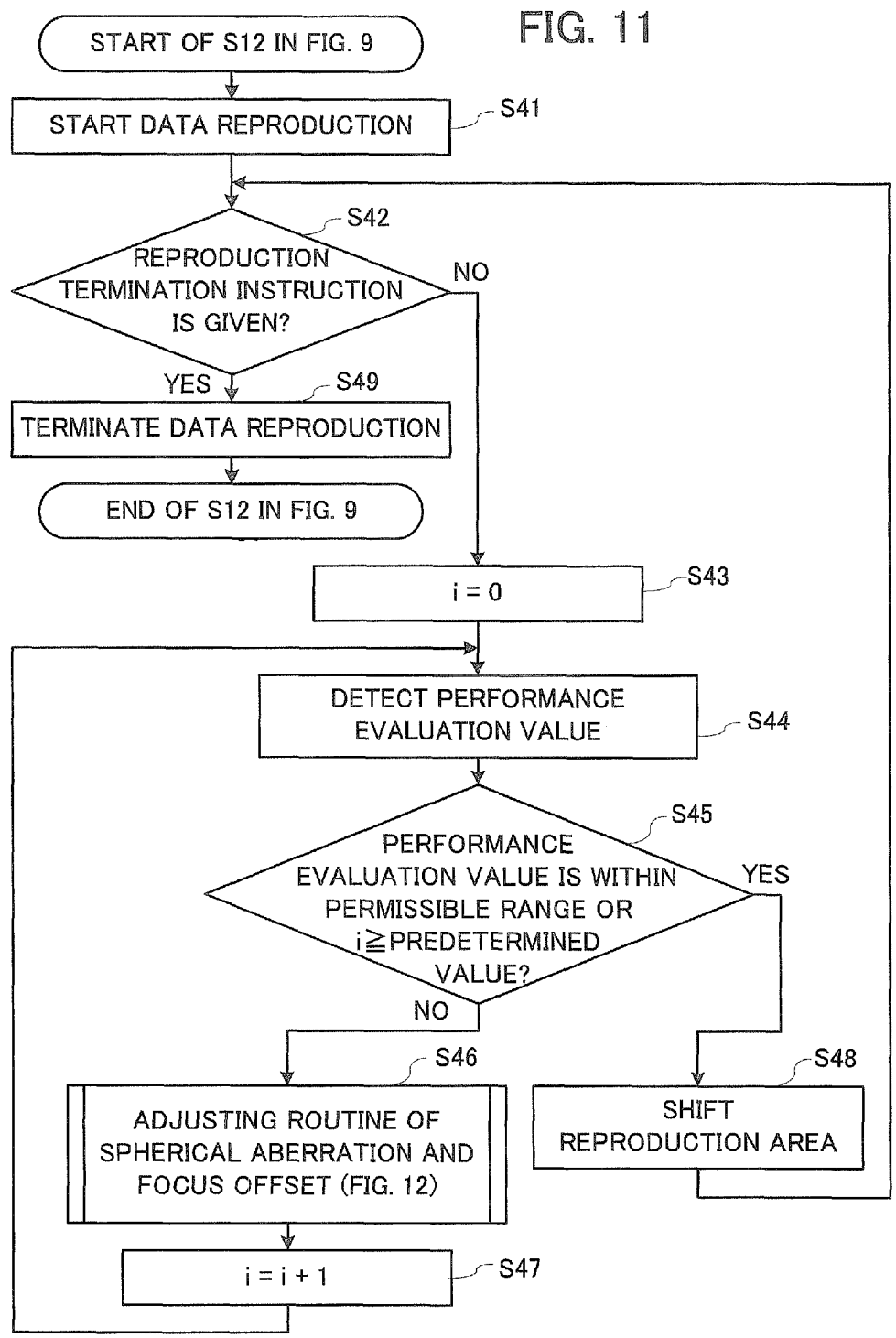
FIG. 11 is a flowchart illustrating an example of processing from data reproduction start to data reproduction completion in the optical information processing apparatus according to the first embodiment.

FIG. 11 is a flowchart illustrating an example of processing from data reproduction start to data reproduction completion in the optical information processing apparatus 10 according to the first embodiment. The processing in FIG. 11 is an example of the reproduction processing in the step S12 in FIG. 9.

As illustrated in FIG. 11, when the optical information processing apparatus 10 starts data reproduction from the optical disc 40 (step S41), the central control unit 29 in the signal processing means 2 determines whether a reproduction termination instruction (an input instruction from a means (an interface) not illustrated in the drawing) is given or not (step S42). If it is determined that the reproduction termination instruction is given in the step S42, the central control unit 29 in the signal processing means 2 terminates the data reproduction operation (step S49).

If it is determined that the reproduction termination instruction is not given in the step S42, the central control unit 29 in the signal processing means 2 causes the light irradiating and receiving means 1 to continue the data reproduction operation and initializes the variable 'i' to zero (step S43). Then, the central control unit 29 in the signal processing means 2 measures a reproduction signal performance evaluation value (step S44) to store it in the memory 30.

Next, the central control unit 29 in the signal processing means 2 determines whether the reproduction signal performance evaluation value is within the permissible range or not and whether 'i' is not less than a predetermined value (step S45). If the reproduction signal performance evaluation value is within the permissible range or '1' is not less than the predetermined value, the central control unit 29 in the signal processing means 2 causes the light irradiating and receiving means 1 to shift a reproduction area (step S48) and the light irradiating and receiving means 1 to continue the data reproduction from the optical disc 40. If the reproduction signal performance evaluation value is without the permissible range and 'i' is less than the predetermined value in the step S45, the central control unit 29 in the signal processing means 2 outputs a control signal to the adjusting means 3 to adjust a spherical aberration and a focus offset by the spherical aberration adjusting element 15 and the objective lens actuator 18 (step S46), increments '1' by one (step S47) and performs the processing of the step S44 and the subsequent processing again. If 'i' is not less than the predetermined value and the reproduction signal performance evaluation value is not within the permissible range in the step S27, the central control unit 29 in the signal processing means 2 may adopt an optimum value out of the performance evaluation values, number of which is number of the adjustments of a spherical aberration and a focus offset. The adjusting method in the step S46 will be explained below in detail referring to the flow-charts in FIG. 12 to FIG. 15.

Figure 12:
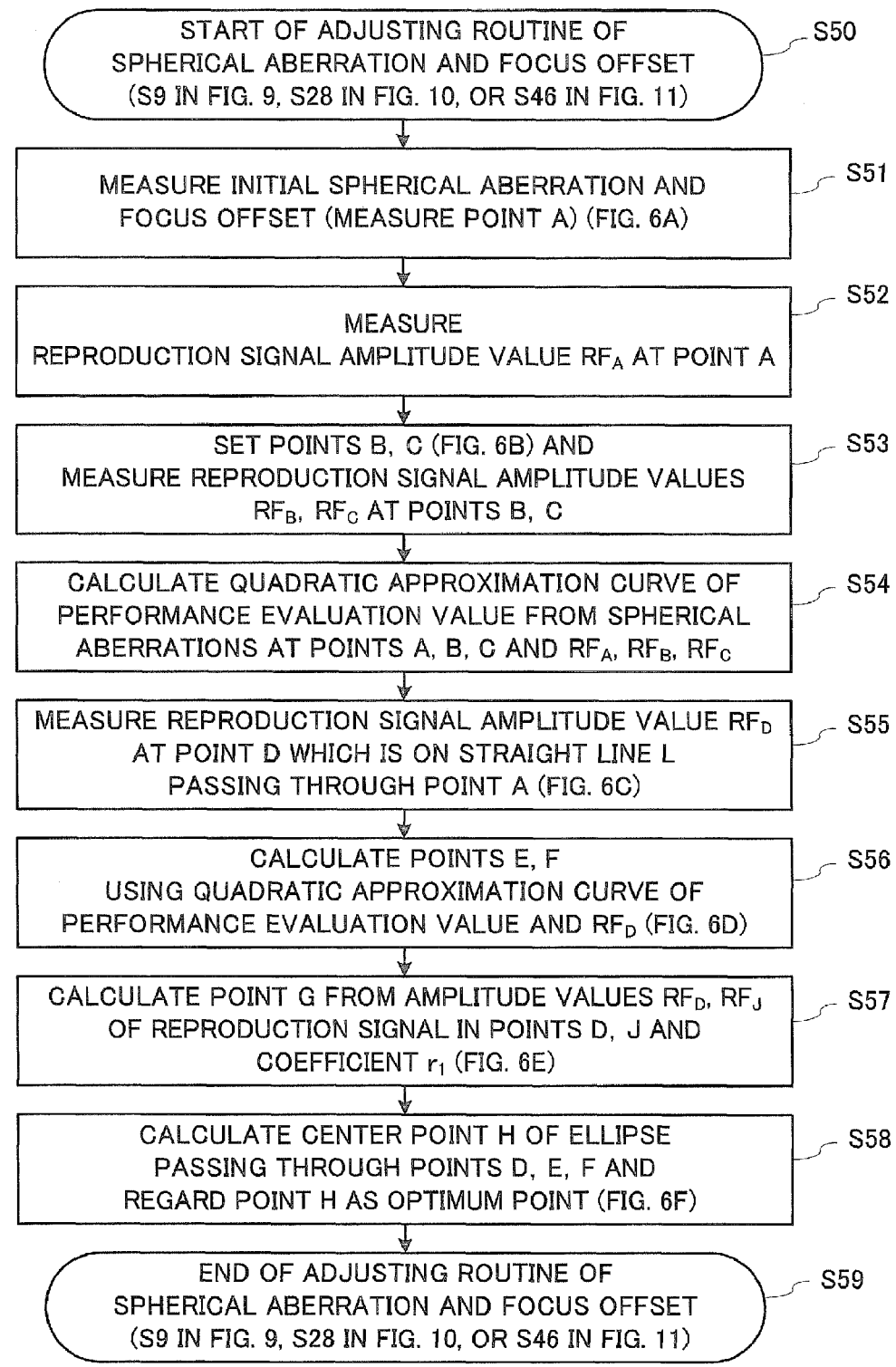
FIG. 12 is a flowchart illustrating an example of a routine for adjusting a spherical aberration and a focus offset in the optical information processing apparatus according to the first embodiment.

FIG. 12 is a flowchart illustrating an example of adjusting routine of a spherical aberration and a focus offset in the optical information processing apparatus 10 according to the first embodiment. FIG. 12 illustrates details of the step S9 in FIG. 9, the step S28 in FIG. 10 or the step S46 in FIG. 11 of the adjusting routine of a spherical aberration and a focus offset. FIG. 12 illustrates the processing explained in FIGS. 6A to 6F as a flowchart.

As illustrated in FIG. 12, when the adjusting routine for starting adjusting a spherical aberration and a focus offset starts (step S50), the signal processing means 2 detects shift amount of the initial SA amount control device and shift amount of the FO amount control device on the basis of detection signal from the optical pickup 11, and designates the point as a first point 'A' in an x and y coordinate system (step S51). In the x and y coordinate system, coordinates of the first point 'A' is represented by ($SA_j$, $FO_j$). Furthermore, each of the spherical aberration $SA_j$ and the focus offset $FO_j$ at the first point 'A' may be set to be zero ($SA_j=0$, $FO_j=0$) instead of performing the reading in the step S51.

Next, the reproduction signal amplitude detector 25 in the signal processing means 2 measures a reproduction signal amplitude value $RF_A$ which is performance evaluation value at the first point 'A' to store it in the memory 30 (step S52).

Next, the central control unit 29 in the signal processing means 2 sets the second point 'B' and the third point 'C' which differs in a spherical aberration and is equal in a focus offset from/to the first point 'A', and the reproduction signal amplitude detector 25 measures a reproduction signal amplitude value $RF_B$ at the second point 'B' and a reproduction signal amplitude value $RF_C$ at the third point 'C' (step S53) to store it in the memory 30. A method of setting the second point 'B' and the third point 'C' will be described below with reference to FIG. 15.

Next, the central control unit 29 in the signal processing means 2 calculates the quadratic approximation curve of the equation (1) on the basis of spherical aberrations at the first point 'A', the second point 'B' and the third point 'C', and the reproduction signal amplitude values $RF_A$, $RF_B$ and $RF_C$ (step S54).

Next, the central control unit 29 in the signal processing means 2 sets the fourth point 'D' which is on the straight line 'L' passing through the first point 'A' and differs from the first point 'A', the reproduction signal amplitude detector 25 measures a reproduction signal amplitude value $RF_D$ at the fourth point 'D' to store it in the memory 30 (step S55). Here, the straight line 'L' is a locus, on which the tracking error signal in the x and y coordinate system has substantially the same amplitude value in two-dimensional rectangular coordinate system whose coordinate axes represent a spherical aberration and a focus offset in FIG. 3, and passes through the first point 'A'. A slope of the straight line 'L' is determined in advance on the basis of data illustrated in FIG. 3 and is stored in the memory 30. Here, a reason for setting the fourth point 'D' on the basis of the data of FIG. 3 is that when the fourth point 'D' is set, a tracking error signal amplitude value can be ensured to some degree (to the same degree as that at the first point 'A'). If the fourth point 'D' is not set on the straight line 'L', there is a possibility that a tracking error signal amplitude value at the fourth point 'D' is less than a tracking error signal amplitude value at the first point 'A', and there is a risk that a tracking error signal amplitude value cannot be made large enough and the adjustment of the spherical aberration and the focus offset cannot be stably performed. If the fourth point 'D' is set on the straight line 'L', since a tracking error signal amplitude value which is substantially equal to the tracking error signal amplitude value at the first point 'A' can be obtained, the fourth point 'D' may be fairly distant from the first point 'A' as long as on the straight line 'L'. However, the fourth point 'D' should be set so that the reproduction signal amplitude value $RF_D$ at the fourth point 'D' is less than the maximum value of the quadratic approximation curve of the equation (1) (a quadratic curve when illustrated in the x and z coordinate system).

Next, the central control unit 29 in the signal processing means 2 calculates the fifth point 'E' and the sixth point 'F' from the quadratic approximation curve of the equation (1) (step S56), i.e., the points 'E' and 'F' are on a straight line passing through the first point 'A', the second point 'B' and the third point 'C', and have reproduction signal amplitude values equivalent to the reproduction signal amplitude value $RF_D$ at the fourth point 'D'. That is to say, a value of the spherical aberration 'x' at the fifth point 'E' and the sixth point 'F' are determined from:

$$z = a_1 x^2 + b_1 x + c_1 \qquad \text{equation (1)}$$

$$z = RF_D \qquad \text{equation (3)}$$

where the value of spherical aberration 'x' at the fifth point 'E' and the sixth point 'F' is determined from an intersection point of the equation (1) and the equation (3) in an x and z coordinate system. In the first embodiment, the focus offsets at the fifth point 'E' and the sixth point 'F' are equal to the focus offsets at the first point 'A', the second point 'B' and the third point 'C'. Here, if the reproduction signal amplitude value $RF_D$ at the fourth point 'D' is larger than the maximum value of a quadratic approximation curve, the intersection point of the equation (1) and the equation (3) cannot be calculated. For this reason, the reproduction signal amplitude value $RF_D$ at the fourth point 'D' is set to be less than the maximum value of the quadratic curve represented by the equation (1).

Next, the central control unit 29 in the signal processing means 2 calculates according to the equation (1) a reproduction signal amplitude value $RF_J$ at the ninth point 'J' where a spherical aberration is equal to the spherical aberration at the fourth point 'D' and a focus offset is equal to the focus offset at the first point 'A'. The central control unit 29 in the signal processing means 2 calculates the seventh point 'G' where a spherical aberration is equal to the spherical aberration at the fourth point 'D' and a reproduction signal amplitude value is equal to the reproduction signal amplitude value $RF_D$ at the fourth, point 'D', on the basis of the reproduction signal amplitude value $RF_J$ at the ninth point 'J' and the ratio $r_1(=a_1/a_2)$ between $a_1$ and $a_2$ in the equations (1) and (2) (step S57). The ratio $r_1$ between $a_1$ and $a_2$ is determined in advance, on the basis of the data illustrated in FIG. 4 and FIG. 5, on a supposition that the ratios are constant for all of optical discs 40, and is stored in the memory 30.

Next, the central control unit 29 in the signal processing means 2 calculates the ellipse 50 which passes through the fourth point 'D', the fifth point 'E', the sixth point 'F' and the seventh point 'G' and calculates the eighth point 'H' which is a center position of the ellipse 50 (step S58). That is to say, in FIG. 2, since an ellipse (an ellipse-like area) having the same reproduction signal amplitude value are formed and a midpoint of the ellipse is an optimum point of a spherical aberration and a focus offset in an x and y coordinate system where coordinate axes are a spherical aberration and a focus offset respectively, it is conceivable that the center point 'H' of the ellipse which passes through the fourth point 'D', the fifth point 'E', the sixth point 'F' and the seventh point 'G', whose reproduction signal amplitude values are equal to each other, is close to an optimum point of a spherical aberration and a focus offset.

Then, the adjusting routine of the spherical aberration and the focus offset is terminated (step S59).

Further, if processing of the step S51 is not performed and it is set to be $SA_j=0$ and $FO_j=0$, spherical aberrations and focus offsets at the second point 'B' to the eighth point 'H' are relative values with reference to a spherical aberration and a focus offset at the first point 'A'.

Figure 13:
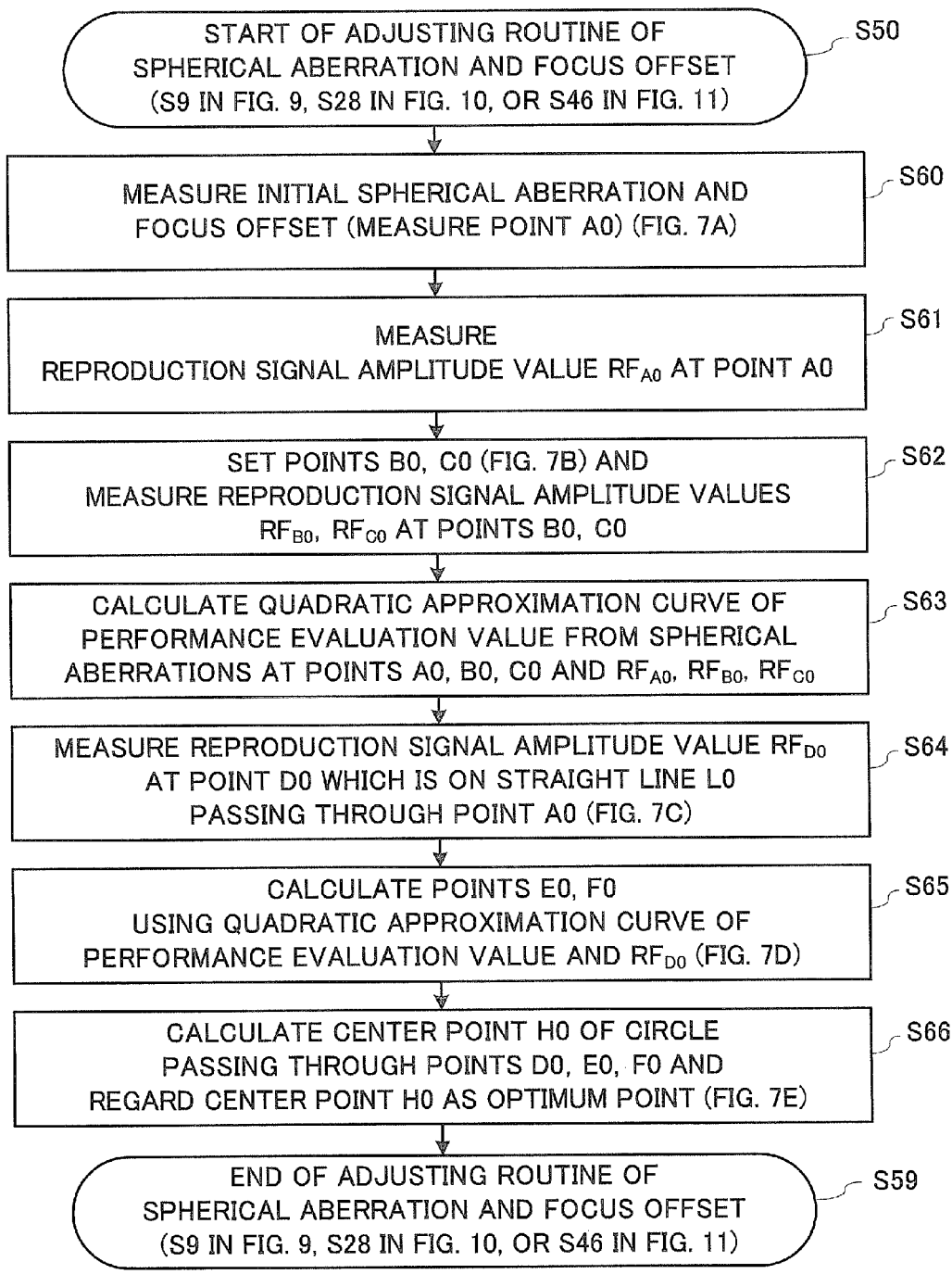
FIG. 13 is a flowchart illustrating another example of the routine for adjusting a spherical aberration and a focus offset in the optical information processing apparatus according to the first embodiment.

FIG. 13 is a flowchart illustrating another example of the adjusting routine of a spherical aberration and a focus offset in the optical information processing apparatus 10 according to the first embodiment. FIG. 13 illustrates details of the adjusting routine of a spherical aberration and a focus offset in the step S9 in FIG. 9, the step S28 in FIG. 10 or the step S46 in FIG. 11. FIG. 13 illustrates the processing explained using FIGS. 7A to 7E as a flowchart. The ratio $r_1$ $(=a_1/a_2)$ between $a_1$ and $a_2$ in the equations (1) and (2) is used, and the spherical aberration is multiplied by $r_1^{1/2}$.

Since processing in steps S60 to S65 in FIG. 13 corresponds to the processing in the steps S51 to S56 in FIG. 12, the explanation will be omitted from the following description. That is to say, a first point A0, a second point B0, a third point C0, a fourth point D0, a fifth point E0, a sixth point F0 and a straight line L0 in FIG. 13 are approximately the same as the first point 'A', the second point 'B', the third point 'C', the fourth point 'D', the fifth point 'E', the sixth point 'F' and the straight line 'L' in FIG. 12, respectively.

After the processing of the step S65, the central control unit 29 in the signal processing means 2 determines a circle 51 which passes through the fourth point D0, the fifth point E0 and the sixth point 'F' and calculates an eighth point H0 which is a center point of the circle 51 (step S66).

Then, the adjusting routine of the spherical aberration and the focus offset is terminated (step 59).

Figure 14:
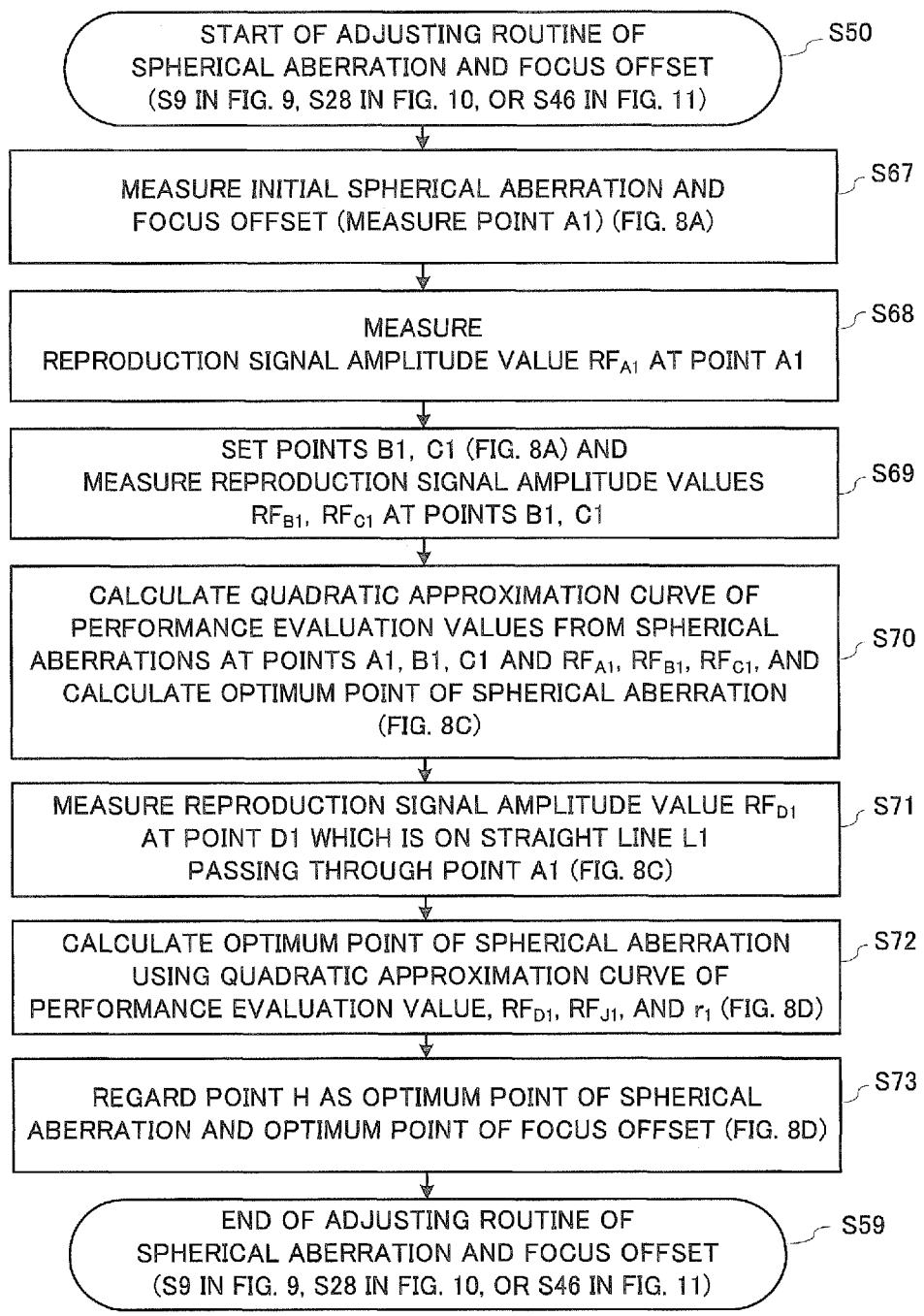
FIG. 14 is a flowchart illustrating another example of the routine for adjusting a spherical aberration and a focus offset in the optical information processing apparatus according to the first embodiment.

FIG. 14 is a flowchart illustrating further another example of the adjusting routine of a spherical aberration and a focus offset in the optical information processing apparatus 10 according to the first embodiment. FIG. 14 illustrates details of the step S9 in FIG. 9, the step S28 in FIG. 10, or the step S46 in FIG. 11 in the adjusting routine of a spherical aberration and a focus offset. FIG. 14 illustrates the processing explained with reference to FIGS. 8A to 8D as a flowchart.

Since the processings of steps S67 to S69 and S71 in FIG. 14 correspond to the processings of the steps S51 to S53 and S55 in FIG. 12, their explanation will be omitted from the following description. Namely, a first point A1, a second point B1, a third point C1, a fourth point D1 and a straight line L1 in FIG. 14 are approximately the same as the first point 'A', the second point 'B', the third point 'C', the fourth point 'D' and the straight line 'L' in FIG. 12, respectively.

After the processing of the step S69, the central control unit 29 in the signal processing means 2 calculates the quadratic approximation curve of the equation (1) on the basis of spherical aberrations at the first point A1, the second point B1 and the third point C1 and the reproduction signal amplitude values $RF_{A1}$, $RF_{B1}$ and $RF_{C1}$, and calculates optimum point of the spherical aberration (step S70).

Next, the central control unit 29 in the signal processing means 2 sets the fourth point D1 which is on the straight line L1 passing through the first point A1 and differs from the first point A1, and the reproduction signal amplitude detector 25 measures a reproduction signal amplitude value $RF_{D1}$ at the fourth point D1 to store it in the memory 30 (step S71).

Next, the central control unit 29 in the signal processing means 2 calculates a reproduction signal amplitude value $RF_{J1}$ at a ninth point J1 where a spherical aberration is equal to the spherical aberration at the fourth point D1 and a focus offset is equal to the focus offset at the first point A1 on the basis of the equation (1). The central control unit 29 in the signal processing means 2 calculates the constants $a_2$, $b_2$ and $c_2$ in the equation (1) on the basis of a reproduction signal amplitude value $RF_{D1}$ at the fourth point D1, the reproduction signal amplitude value $RF_{J1}$ at the ninth point J1 and the ratio $r_1$ $(=a_1/a_2)$ between $a_1$ and $a_2$ in the equations (1) and (2), and calculates a focus offset where a reproduction signal amplitude value is maximum, i.e., a focus offset optimum point (step S72).

Next, the central control unit 29 in the signal processing means 2 sets an optimum point of the spherical aberration and the focus offset, which is calculated in the steps S70 and S72, to be an eighth point 'H' (step S73).

Then, the adjusting routine of the spherical aberration and the focus offset is terminated (step S59).

In the adjusting routine of a spherical aberration and a focus offset in FIG. 14, since the fifth point 'E' and the sixth point 'F' are not calculated as in FIG. 12, there is no limit for setting the point D1 on the straight line L1. Namely, the reproduction signal amplitude value $RF_{D1}$ at the fourth point D1 may be larger than the maximum value of the quadratic curve represented by the quadratic approximation curve of the equation (1).

Figure 15:
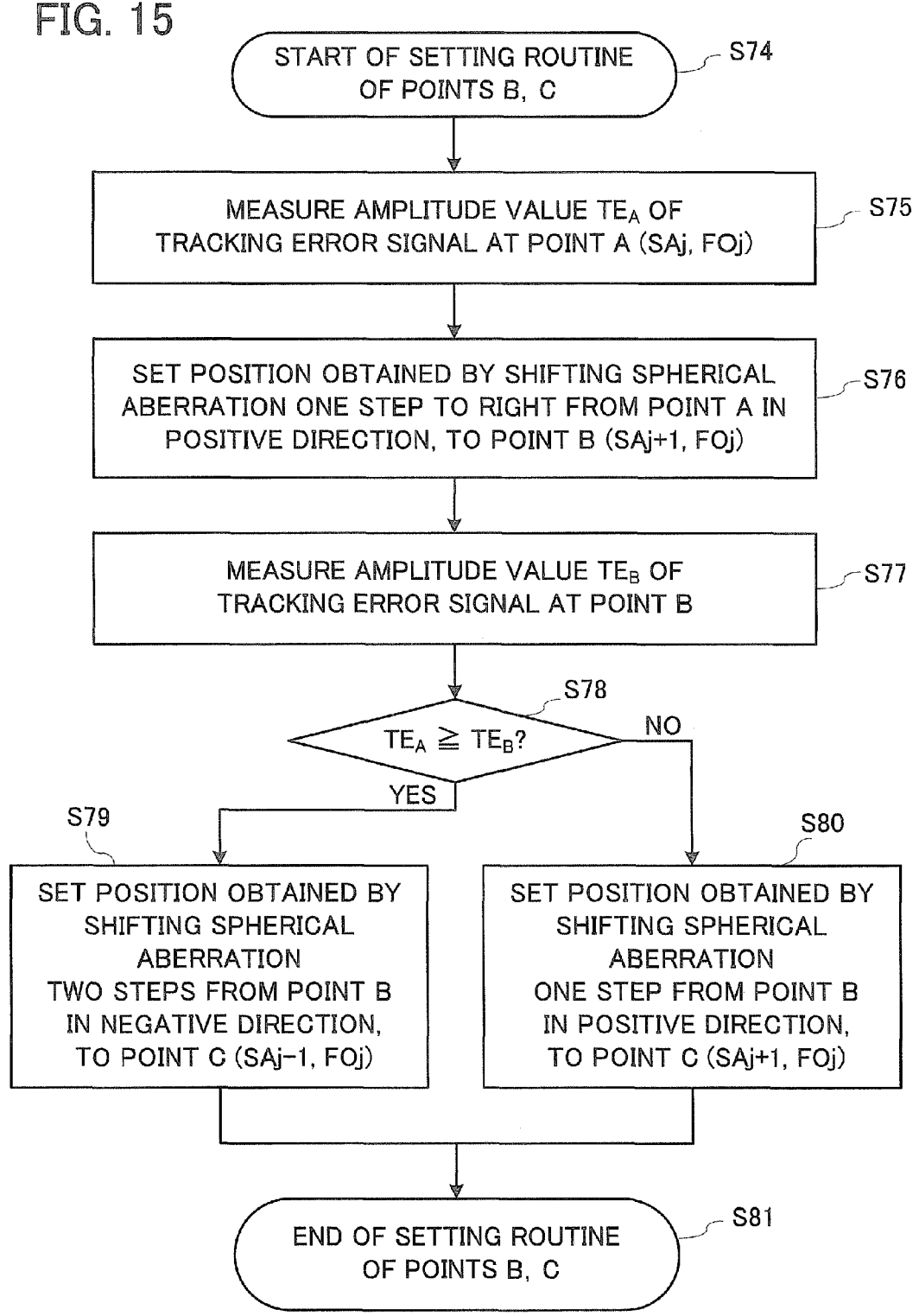
FIG. 15 is a flowchart illustrating an example of a routine for setting a second point 'B' and, a third point 'C' in step S53 in FIG. 6B and FIG. 12.

FIG. 15 is a flowchart illustrating an example of a setting routine of the second point 'B' and the third point 'C' in the step S53 in FIG. 6B and FIG. 12. Although the setting routine of the points 'B' and 'C' is illustrated in this example, substantially the same processing is made in the setting routine of the second point B0 and the third point C0 in the step S62 in FIG. 7B and FIG. 13 and the setting routine of the second point B1 and the third point C1 in the step S69 in FIG. 8B and FIG. 14. In FIG. 15, when an instruction to start setting the second point 'B' and the third point 'C' is given (step S74), the tracking error signal amplitude detector 28 in the signal processing means 22 measures a tracking error signal amplitude value $TE_A$ at the first point 'A' (step S75).

Next, the central control unit 29 in the signal processing means 2 controls the adjusting means 3 to drive the spherical aberration adjusting element 15 in the optical pickup 11, shift the spherical aberration one step to the right from the first point 'A' (a positive direction in FIG. 6B), thereby obtain the second point 'B' (step S76). A spherical aberration at the second point 'B' is denoted by $SA_j+1$. It is not necessary that the spherical aberration at the second point 'B' is a spherical aberration shifted one step to the right from the first point 'A'. Further, the second point 'B' may be more than one step distant from the first point 'A' as long as a tracking error signal amplitude value may be ensured.

Next, the tracking error signal amplitude detector 28 in the signal processing means 2 measures a tracking error signal amplitude value $TE_B$ at the second point 'B' (step S77).

Next, the central control unit 29 in the signal processing means 2 compares the tracking error signal amplitude value $TE_A$ measured in the step S75 with the tracking error signal amplitude value $TE_B$ measured in the step S77 (step S78). In the step S78, if the tracking error signal amplitude value $TE_A$ is not less than the tracking error signal amplitude value $TE_B$, the central control unit 29 in the signal processing means 2 controls the adjusting means 3, drives the spherical aberration adjusting element 15 in the optical pickup 11, shifts the spherical aberration two steps to the left from the second point 'B' (in a negative direction in FIG. 6B) (step S79), and sets the point as a third point 'C'. In this case, a spherical aberration at the third point is denoted by $SA_j-1$. A reason for setting the third point 'C' like this is as follows: if the spherical aberration shifted one step to the right from the second point 'B' (a positive direction in FIG. 6) is adopted as a spherical aberration at the third point 'C', there is a possibility that a tracking error signal amplitude value at the third point 'C' is less than a tracking error signal amplitude value at the second point 'B'. In the step S78, if the tracking error signal amplitude value $TE_A$ is less than the tracking error signal amplitude value $TE_B$, the central control unit 29 in the signal processing means 2 sets a point where a spherical aberration is shifted one step to the right from the second point 'B' (in a positive direction in FIG. 6B) as the third point 'C' (step S80). In this case, the spherical aberration at the third point 'C' is denoted by $SA_j+2$. In the steps S79 and S80, shift two step to the left and one step to the right from the second point 'B' is not indispensable, the third point 'C' may be shifted more than two steps to the left and one step to the right from the second point 'B' as long as a tracking error signal amplitude value may be ensured.

Then, the central control unit 29 in the signal processing means 2 terminates the setting routine of the second point 'B' and the third point 'C' (step S81).

The quadratic approximation curves in the step S54 in FIG. 12, the step S63 in FIG. 13 and the step S70 in FIG. 14 are calculated on the basis of the reproduction signal amplitude values at the three points: the first point 'A', the second point 'B' and the third point 'C'. However, a quadratic approximation curve of the reproduction signal amplitude value versus the spherical aberration should be convex upward. For this reason, if a quadratic approximation curve which is convex downward is calculated as the quadratic approximation curve of the reproduction signal amplitude value, processing for obtaining a quadratic approximation curve which is convex upward is necessary, for example, calculating the quadratic approximation curve on the basis of the reproduction signal amplitude values at four or more points. In such a case, measuring the reproduction signal amplitude values at four or more points enables to optimally adjust the spherical aberration and the focus offset (this case will be described in the second embodiment).

Figure 16:
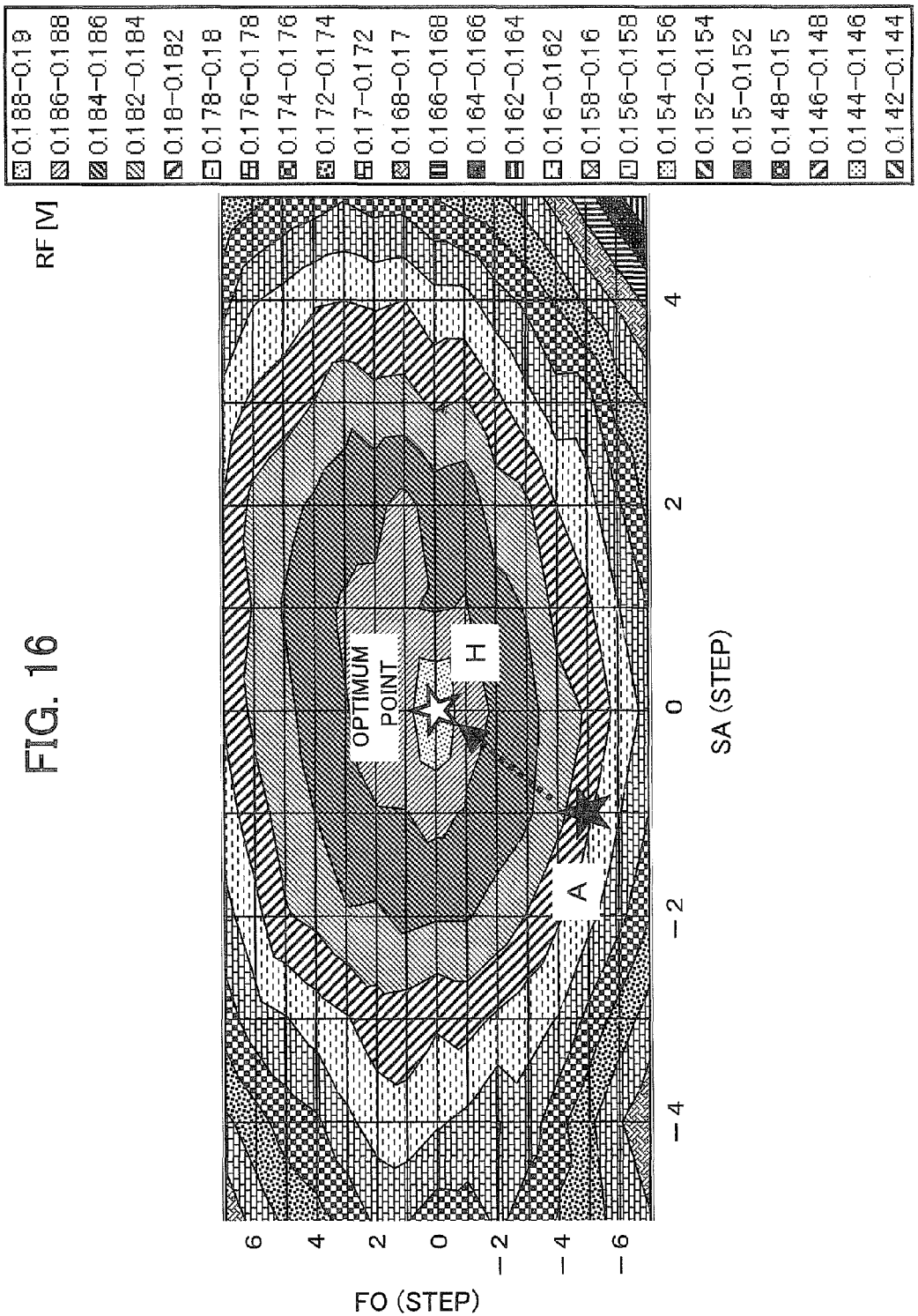
FIG. 16 is a diagram illustrating a result of adjusting a spherical aberration and a focus offset by the optical information processing apparatus and the optical information processing method according to the first embodiment.

FIG. 16 is a diagram illustrating a result of adjusting the spherical aberration and the focus offset by the optical information processing apparatus and the optical information processing method according to the first embodiment. FIG. 16 illustrates a result of the adjustment when a quadratic approximation curve is calculated on the basis of three points where spherical aberrations differ from and focus offsets are the same with each other. It is understood from FIG. 16 that the spherical aberration and the focus offset are adjusted to an optimum point (a white star).

As described above, the optical information processing apparatus 10 and the optical information processing method according to the first embodiment make it possible to perform adjustment for optimizing the spherical aberration and the focus offset in an apparatus for recording on and/or reproducing the optical disc 40 in a short time without causing off-servo and without deteriorating reproduction signal quality.

Although the adjustment of the spherical aberration and the focus offset is performed on the basis of the reproduction signal amplitude value in the above explanation, the adjustment may be performed on the basis of an indicator of the reproduction signal quality from an optical disc, such as a reproduction jitter value and an error rate. This is because, as well as the reproduction signal amplitude value, the reproduction jitter value or the error rate is represented by a plurality of concentric ellipse areas in a two-dimensional rectangular coordinate system where a spherical aberration and a focus offset are represented by coordinate axes respectively and the reproduction signal quality is the lowest at a center point of the ellipse. However, a quadratic approximation curve of the reproduction jitter value or the error rate is required to be convex downward, unlike the quadratic approximation curve of the reproduction signal amplitude value. For this reason, if a quadratic approximation curve which is calculated as a quadratic approximation curve of the reproduction jitter value or error rate is convex upward, processing for obtaining a quadratic approximation curve which is convex downward is needed, for example, calculating a quadratic approximation curve on the basis of the reproduction signal amplitude values at four or more points. In such a case, measuring the reproduction signal amplitude values at four or more points enables to optimally adjust the spherical aberration and the focus offset (this case will be described in the second embodiment).

In the above description, when an apparatus including the optical information processing apparatus 10 does not have a function to record data on the optical disc 40, if it is determined that no data is recorded on the optical disc (not yet recorded) in the step S4 in FIG. 9, processing of ejecting the optical disc 40 may be performed instead of processing of the steps S5 and S6, and the adjustment of the spherical aberration and the focus offset may not be performed.

Second Embodiment

FIGS. 17A to 17F are diagrams for explaining operation in an optical information processing apparatus according to a second embodiment, i.e., an optical information processing method according to the second embodiment. A first point A2, a second point B2, a third point C2, a fourth point D2, a fifth point E2, a sixth point F2, a seventh point G2, an eighth point H2, a ninth point J2 and a straight line L2 in FIGS. 17A to 17F are approximately the same as the first point 'A', the second point 'B', the third point 'C', the fourth point 'D', the fifth point 'E', the sixth point 'F', the seventh point 'G', the eighth point 'H', the ninth point 'J' and the straight line 'L' in FIGS. 6A to 6F, respectively.

Figure 17B:
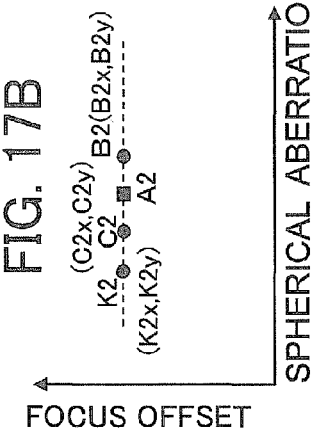
FIGS. 17A to 17F are diagrams for explaining operation in an optical information processing apparatus according to a second embodiment of the present invention, i.e., an optical information processing method according to the second embodiment.
Figure 17D:
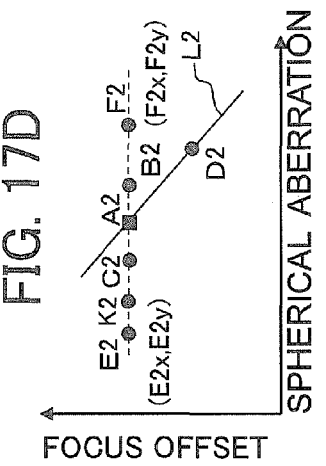
Figure 17F:
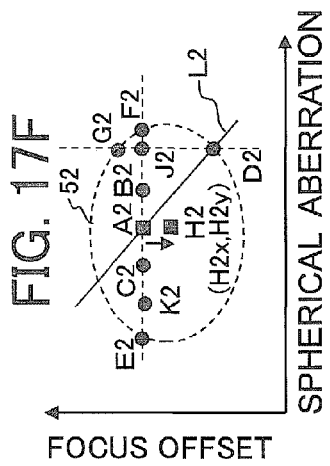
Figure 17A:
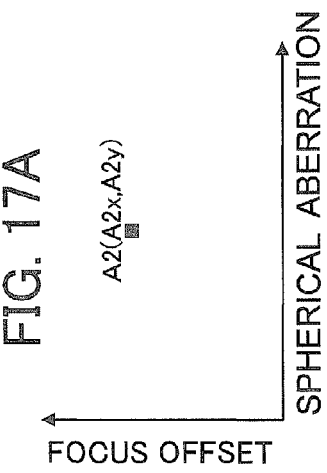
Figure 17C:
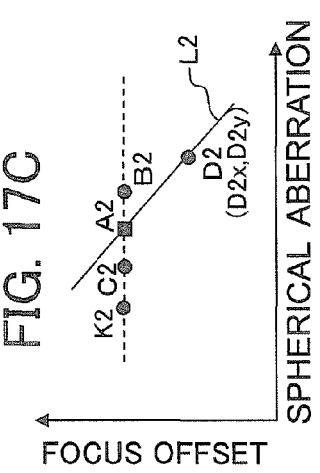
Figure 17E:
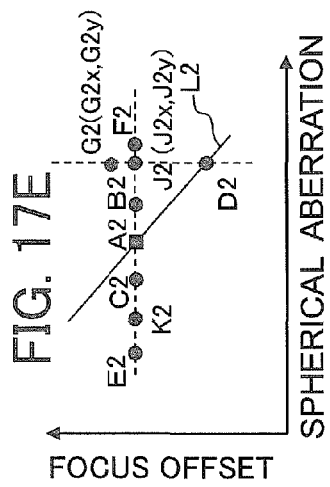

The second embodiment differs from the first embodiment in the following points that: as illustrated in FIG. 17B, a step of calculating quadratic approximation curve of performance evaluation value includes a step in which the signal processing means 2 sets a tenth point K2 in an x and y coordinate system where an x-coordinate is K2x which is different from any of A2x, B2x and C2x and a y-coordinate is K2y which is equal to A2y, and calculates a tenth performance evaluation value K2z indicating characteristic of the reproduction signal at the tenth point K2; and that a quadratic approximation curve is calculated on the basis of a first evaluation point A2z, a second evaluation point B2z, a third evaluation point C2z and the tenth evaluation point K2z. The processing in the second embodiment may be implemented if a desired quadratic approximation curve cannot be obtained (in a case that a convex direction is an inverse direction or the like) in the first embodiment.

Except for the respects described above, the second embodiment is the same as the first embodiment. In the second embodiment, substantially the same method to that of setting the points 'B' and 'C' in FIG. 15 is used as a method of setting the tenth point K2, for example and the method is the same as the adjusting methods in FIGS. 6A to 6F, FIGS. 7A to 7E and FIGS. 8A to 8D, except for setting the tenth point K2.

Third Embodiment

Figure 18:
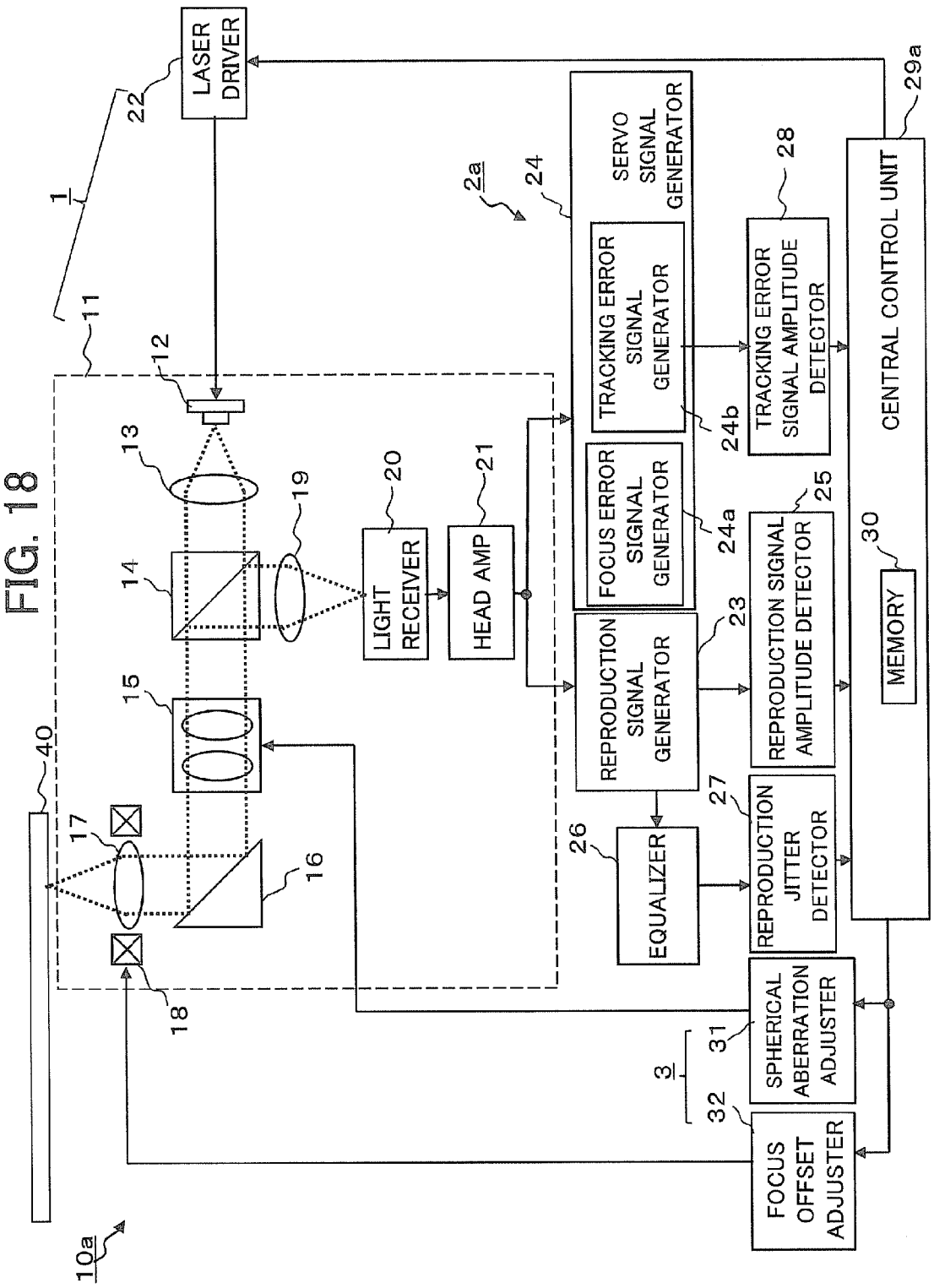
FIG. 18 is a diagram schematically illustrating a structure of an optical information processing apparatus according to a third embodiment (i.e., an apparatus capable of carrying out an optical information processing method according to the third embodiment)

FIG. 18 is a diagram schematically illustrating a structure of an optical information processing apparatus 10a according to a third embodiment (i.e., an apparatus capable of carrying out an optical information processing method according to the third embodiment) of the present invention. Components in FIG. 18 that are the same as or correspond to those in FIG. 1 are assigned the same reference characters. The optical information processing apparatus 10a according to the third embodiment differs from the first or second embodiment in contents of signal processing by a signal processing means 2a.

FIGS. 19A to 19F are diagrams for explaining operation of the optical information processing apparatus 10a according to the third embodiment, i.e., the optical information processing method according to the third embodiment. A first point A3 (A3x, A3y), a second point B3 (B3x, B3y), a third point C3 (C3x, C3y), a fourth point D3 (D3x, D3y), a fifth point E3 (E3x, E3y), a sixth point F3 (F3x, F3y), a seventh point G3 (G3x, G3y), an eighth point H3 (H3x, H3y), a ninth point J3 (J3x, J3y), a straight line L3 and an ellipse 53 in FIGS. 19A to 19F correspond to the first point 'A' (Ax, Ay), the second point 'B' (Bx, By), the third point 'C' (Cx, Cy), the fourth point 'D' (Dx, Dy), the fifth point 'E' (Ex, Ey), the sixth point 'F' (Fx, Fy), the seventh point 'G' (Gx, Gy), the eighth point 'H' (Hx, Hy), the ninth point 'J' (Jx, Jy), the straight line 'L' and the ellipse 50 in FIGS. 6A to 6F, respectively.

Figure 20:
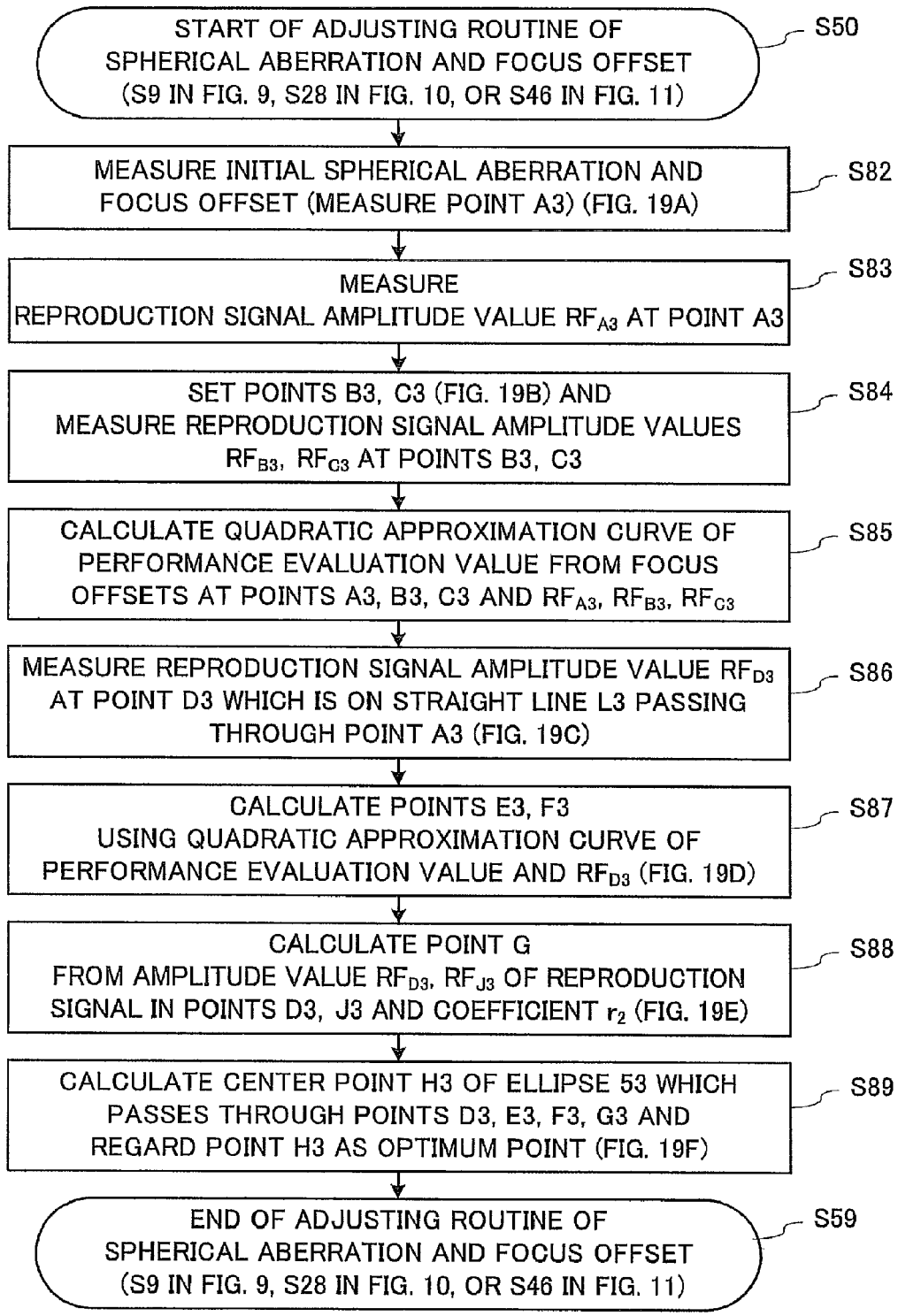
FIG. 20 is a flowchart illustrating an example of a routine for adjusting a spherical aberration and a focus offset in the optical information processing apparatus according to the third embodiment.

FIG. 20 is a flowchart illustrating an example of an adjusting routine of a spherical aberration and a focus offset in the optical information processing apparatus 10a according to the third embodiment. FIG. 20 illustrates an example of the adjusting routine of the spherical aberration and the focus offset in the step S9 in FIG. 9, the step S28 in FIG. 10 or the step S46 in FIG. 11. FIG. 20 illustrates the processing explained with reference to FIGS. 19A to 19F as a flowchart. Steps S82 to S89 in FIG. 20 correspond to the steps S51 to S58 in FIG. 12 which have been already described.

As illustrated in FIG. 20, when the adjusting routine of a spherical aberration and a focus offset starts (step S50), the signal processing means 2a reads an initial spherical aberration and focus offset, designates the point as the first point A3 (step S82), measures a reproduction signal amplitude value $RF_{A3}$ which is performance evaluation value at the fist point A3 (step S83), sets the second point B3 and the third point C3 which differ in a focus offset from and is the same in a spherical aberration as the first point A3, and measures a reproduction signal amplitude value $RF_{B3}$ at the second point B3 and a reproduction signal amplitude value $RF_{C3}$ at the third point C3 (step S84). A setting method for setting the second point B3 and the third point C3 will be explained below with reference to FIG. 21.

Next, the central control unit 29a in the signal processing means 2a calculates a quadratic approximation curve of the equation (2) on the basis of focus offsets at the first point A3, the second point B3 and the third point C3 and the reproduction signal amplitude values $RF_{A3}$, $RF_{B3}$ and $RF_{C3}$, (step S85), sets the fourth point D3 which is on the straight line L3 passing through the first point A3 and differs from the first point A3, and measures a reproduction signal amplitude value $RF_{D3}$ at the fourth point D3 (step S86). Here, the straight line L3, likewise the straight line 'L' in the first embodiment, has a slope determined in advance on the basis of data illustrated in FIG. 3.

Next, the central control unit 29a in the signal processing means 2a calculates the fifth point E3 and the sixth point F3 which are on a straight line passing through the first point A3, the second point 83 and the third point C3 and have a reproduction signal amplitude value equivalent to the reproduction signal amplitude value $RF_{D3}$ at the fourth point D3, from a quadratic approximation curve of the equation (2) (step S87), i.e., a value of the focus offset 'x' at the fifth point E3 and the sixth point F3 are determined from:

$$z = a_2 x^2 + b_2 x + c_2 \qquad \text{equation (2)}$$

$$z = RF_{D3} \qquad \text{equation (4)}$$

That is to say, in an x and z coordinate system, from an intersection point of the equation (2) and the equation (4), the values of the focus offsets at the fifth point E3 and the sixth point F3 are determined.

Next, the central control unit 29a in the signal processing means 2a calculates a reproduction signal amplitude value $RF_{J3}$ at the ninth point J3 where a spherical aberration is equal to that at the fourth point D3 and a focus offset is equal to that at the first point A3 on the basis of the equation (2). The central control unit 29a in the signal processing means 2a calculates the seventh point G3 where a spherical aberration is equal to that at the fourth point D3 and a reproduction signal amplitude value is equal to the reproduction signal amplitude value $RF_{D3}$ at the fourth point D3 on the basis of the reproduction signal amplitude value $RF_{J3}$ at the ninth point J3 and the ratio $r_2$ ($=a_2/a_1$) between $a_1$ and $a_2$ in the equations (1) and (2) (step S88). The ratio $r_2$ between $a_1$ and $a_2$ is determined in advance on the basis of the data illustrated in FIG. 4 and FIG. 5, on a supposition that the ratios are constant for all of optical discs 40, and stored in the memory 30.

Next, the central control unit 29a in the signal processing means 2a determines the ellipse 53 which passes through the fourth point D3, the fifth point E3, the sixth point F3 and the seventh point G3 and calculates the eighth point H3 which is a center point of the ellipse 53 (step S89). That is to say, in FIG. 2, since an ellipse (an ellipse-like area) having the same reproduction signal amplitude value is formed in the x and y coordinate system where a spherical aberration and a focus offset are represented by coordinate axes and a midpoint of the ellipse is an optimum point for the spherical aberration and the focus offset, it is conceivable that the center point H3 of the ellipse passing through the fourth point D3, the fifth point E3, the sixth point F3 and the seventh point G3, which has the same reproduction signal amplitude value is a point close to the spherical aberration and focus offset optimum point.

Then, the adjusting routine of a spherical aberration and a focus offset is terminated (step S59).

Figure 21:
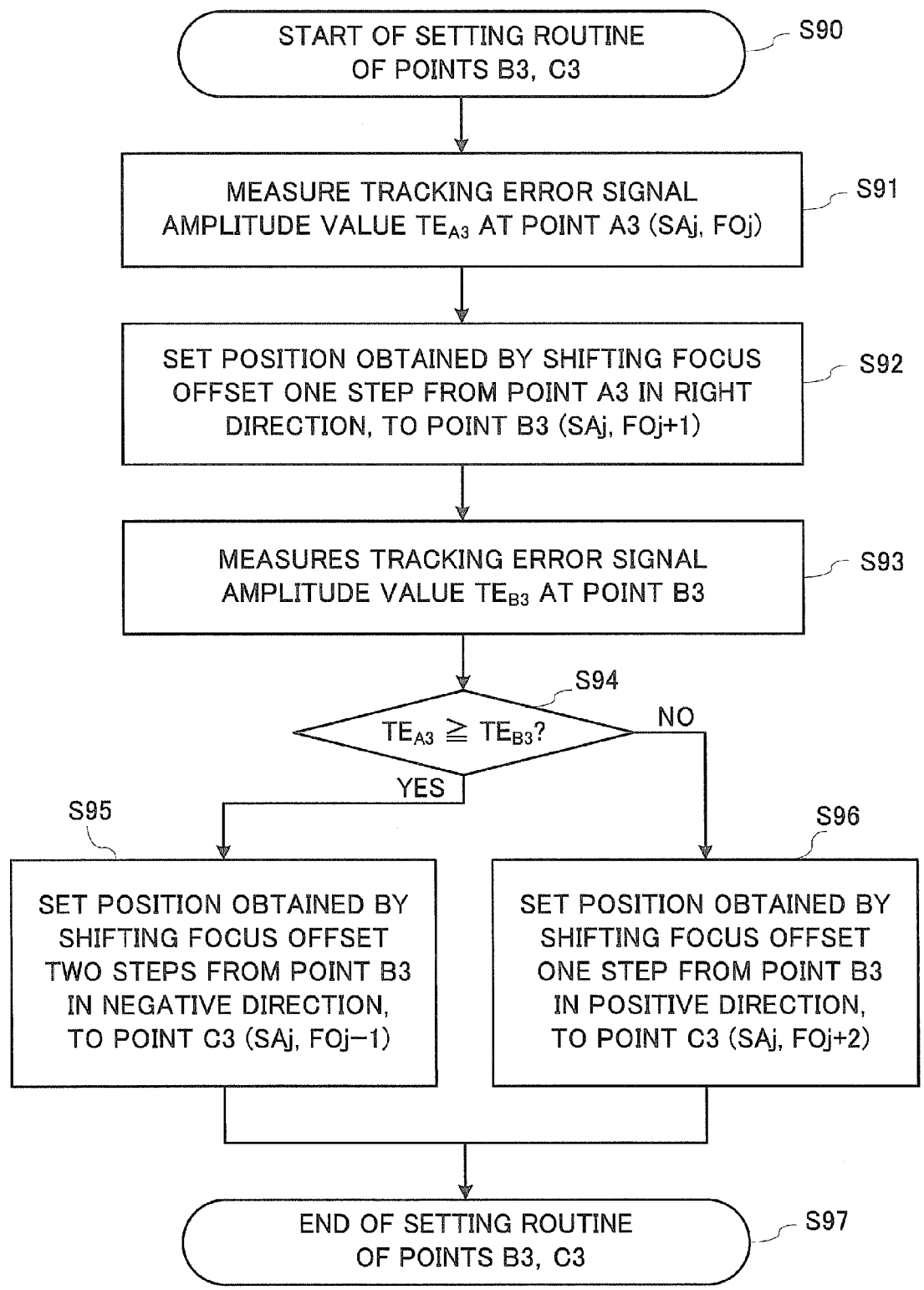
FIG. 21 is a flowchart illustrating an example of a routine for setting a second point B3 and a third point C3 in step S85 in FIG. 19B and FIG. 20.

FIG. 21 is a flowchart illustrating an example of a setting routine of the second point B3 and the third point C3 in step S84 in FIG. 19B and FIG. 20. Steps S90 to S97 in FIG. 21 corresponds to the steps S74 to S81 in FIG. 15 already described above. In FIG. 21, when an instruction for starting setting of the second point B3, the third point C3 is given (step S90), the tracking error signal amplitude detector 28 in the signal processing means 2a measures a tracking error signal amplitude value $TE_{A3}$ at the first point A3 (step S91).

Next, the central control unit 29a in the signal processing means 2a controls the adjusting means 3, shifts the spherical aberration one step to the right (in a positive direction in FIG. 15B) from the first point A3 by driving the spherical aberration adjusting element 15 in the optical pickup 11, and sets the point to be the second point 83 (step S92). A focus offset at the second point 33 is denoted by $FO_j+1$. It is not necessary that the focus offset at the second point B3 is a focus offset shifted one step to the right from the first point A3. The second point B3 may be more than one step distant from the first point A3, as long as a tracking error signal amplitude value may be ensured.

Next, the tracking error signal amplitude detector 28 in the signal processing means 2a measures a tracking error signal amplitude value $TE_{B3}$ at the second point B3 (step S93).

Next, the central control unit 29a in the signal processing means 2a compares the tracking error signal amplitude value $TE_{A3}$ measured in the step S91 with the tracking error signal amplitude value $TE_{B3}$ measured in the step S93 (step S94). If the tracking error signal amplitude value. $TE_{A3}$ is not less than the tracking error signal amplitude value $TE_{B3}$ in the step S94, the central control unit 29a in the signal processing means 2a controls the adjusting means 3, shifts the focus offset two steps to the left from the second point B3 (in a negative direction in FIG. 19B) by driving the spherical aberration adjusting element 15 in the optical pickup 11 (step S95), thereby designates the point as a third point C3. In this case, the focus offset at the third point C3 is denoted by $FO_j-1$. A reason for setting the third point C3 like this is as follows: if the focus offset shifted one step to the right (in a positive direction in FIG. 19B) from the second point B3 is adopted as the focus offset at the third point C3, there is a possibility that a tracking error signal amplitude value at the third point C3 is less than a tracking error signal amplitude value at the second point B3. If the tracking error signal amplitude value $TE_{A3}$ is less than the tracking error signal amplitude value $TE_{B3}$ in the step S94, the central control unit 29a in the signal processing means 2a sets a point where the focus offset is shifted one step to the right (in a positive direction in FIG. 19B) from the second point B3, as the third point C3 (step S96). In this case, the focus offset at the third point C3 is denoted by $FO_j+2$. The shift two steps to the left from the second point B3 and one step to the right in the steps S95 and S96 is not indispensable. The third point C3 may be shifted more than two steps to the left and one step to the right from the second point B3, as long as a tracking error signal amplitude value may be ensured.

Then, the central control unit 29a in the signal processing means 2a terminates the setting routine of the second point B3 and the third point C3 (step S97).

Figure 22:
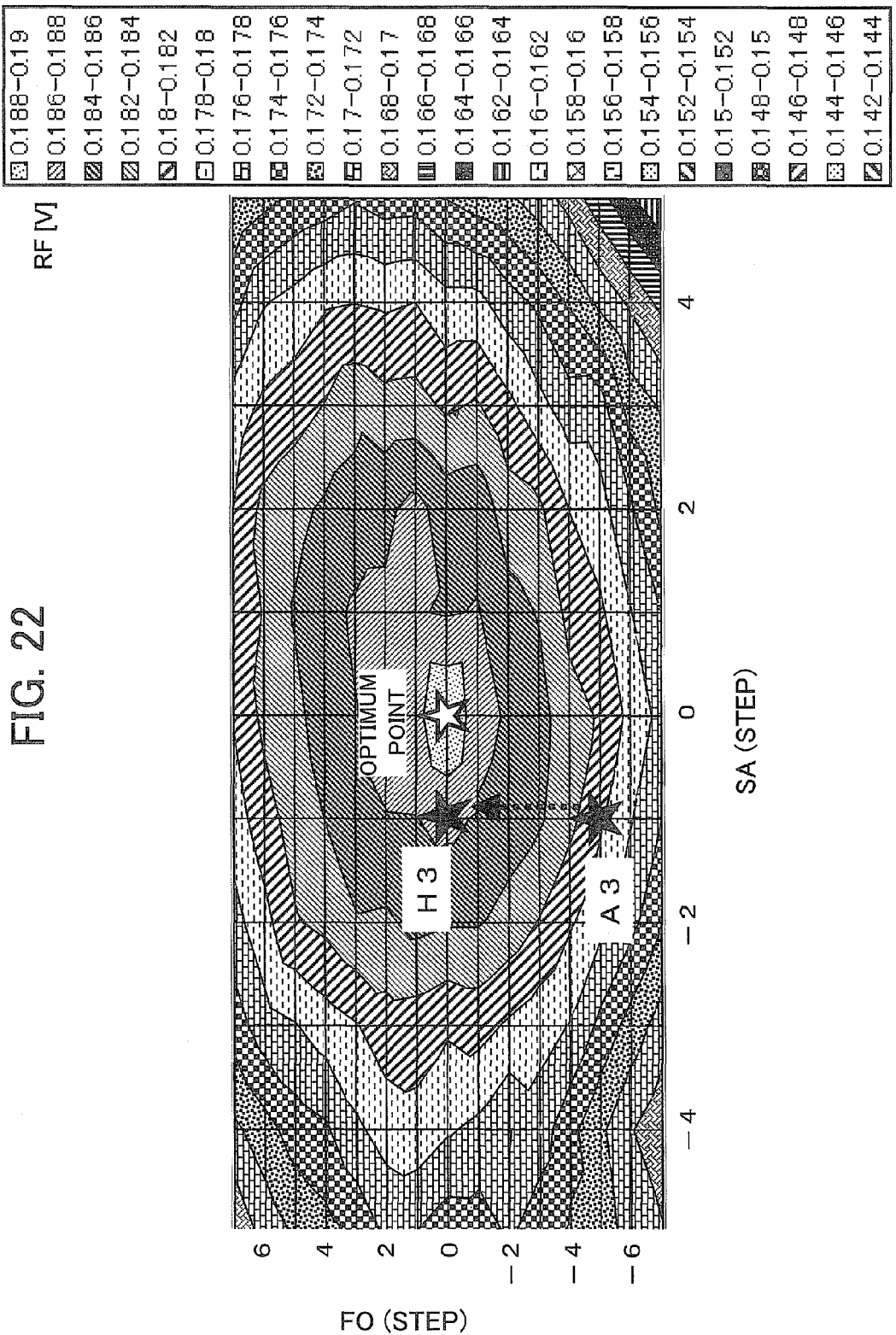
FIG. 22 is a diagram illustrating a result of adjusting a spherical aberration and a focus offset by the optical information processing apparatus and the optical information processing method according to the third embodiment.

FIG. 22 is a diagram illustrating a result of adjusting a spherical aberration and a focus offset by the optical information processing apparatus 10a and the optical information processing method according to the third embodiment. FIG. 22 illustrates a result of adjustment when a quadratic approximation curve is calculated on the basis of three points whose focus offsets differ from and spherical aberrations are the same with each other. It is understood from FIG. 22 that a spherical aberration and a focus offset are adjusted to move them near an optimum point.

As described above, the optical information processing apparatus 10a and the optical information processing method according to the third embodiment makes it possible to perform adjustment for optimizing a spherical aberration and a focus offset in an apparatus for recording on and/or reproducing the optical disc 40 in a short time without causing off-servo and without deteriorating reproduction signal quality.

Except for the respects described above, the third embodiment is the same as the first or second embodiment. In the third embodiment, as well as in the second embodiment, there is a case that a tenth point K2 is set, for example, and a method approximately the same as that of setting the points 'B' and 'C' in FIG. 15 is used as a method of setting the tenth point K2. Except for setting the tenth point K2, it is the same as the adjusting methods in FIGS. 6A to 6F, FIGS. 7A to 7E and FIGS. 8A to 8D. However, if the adjusting method of FIGS. 7A to 7E is used in the third embodiment, it is necessary to multiply the focus offset by $r_2^{1/2}$.

Explanation of Reference Characters 1 light irradiating and receiving means; 2, 2a signal processing means; 3 adjusting means; 10, 10a optical information processing apparatus; 11 optical pickup; 12 semiconductor laser; 13 collimating lens; 14 splitter; 15 spherical aberration adjusting element; 16 total-reflection mirror; 17 objective lens; 18 objective lens actuator; 19 detection lens; 20 light receiver; 21 head amp; 22 laser driver; 23 reproduction signal generator; 24 servo signal generator; 25 reproduction signal amplitude detector; 26 equalizer; 27 reproduction jitter detector; 28 tracking error signal amplitude detector; 29, 29a central control unit; 30 memory; 31 spherical aberration adjuster; 32 focus offset adjuster; 40 optical disc; 50, 52, 53 ellipse; 51 circle; A, A0, A1, A2, A3 first point; B, B0, B1, B2, B3 second point; C, C0, C1, C2, C3 third point; D, D0, D1, D2, D3 fourth point; E, E0, E2, E3 fifth point; F, F0, F2, F3 sixth point; G, G2, G3 seventh point; H, H0, H1, H2, H3 center point; J, J1, J2, J3 ninth point; K2 tenth point; L, L0, L1, L2, L3 straight line passing through first point.

What is claimed is:

1. An optical information processing method comprising:
a light irradiating and receiving step of irradiating an information recording surface of an optical disc with laser light as a light collecting spot and detecting reflected light from the information recording surface of the optical disc;
a signal processing step of detecting shift amount of a first control device for controlling amount of a spherical aberration at the light collecting spot and shift amount of a second control device for controlling amount of a focus offset indicating a shift of the light collecting spot from a correct focal point, from a detection signal of the reflected light outputted in the light irradiating and receiving step, generating a reproduction signal, and detecting a performance evaluation value which indicates characteristic of the reproduction signal; and
an adjusting step of adjusting the spherical aberration on the basis of the shift amount of the first control device and the performance evaluation value and adjusting the focus offset on the basis of the shift amount of the second control device and the performance evaluation value;
wherein said signal processing step includes a detecting process of the performance evaluation values form a first point, a second point, a third point and a fourth point in an x and y coordinate system, in which an x-coordinate is one of the shift amount of the first control device and the shift amount of the second control device and a y-coordinate is the other, the first point, the second point and the third point having the same y-coordinate and different x-coordinates with each other, the fourth point being provided on a first straight line which passes through the first point, the fourth point and the first point having different x-coordinates and different y-coordinates with each other.

2. The optical information processing method according to claim 1, wherein
said signal processing step includes the steps of:
detecting z1 which is the performance evaluation value at a first point of the xy-coordinates (x1, y1);
setting a second point of the xy-coordinates (x2, y2) by using x2 which is an x-coordinate and y2 which is a y-coordinate, said x2 being different from said x1, said y2 being equal to said y1, and detecting z2 which is the performance evaluation value at the second point;

setting a third point of the xy-coordinates (x3, y3) by using x3 which is an x-coordinate and y3 which is a y-coordinate, said x3 being different from both of said x1 and said x2, said y3 being equal to said y1, and detecting z3 which is the performance evaluation value at the third point;

calculating a quadratic approximation curve approximately representing the performance evaluation value by a quadratic function of the x-coordinate value, on the basis of a first evaluation point (x1, z1), a second evaluation point (x2, z2) and a third evaluation point (x3, z3), in an x and z coordinate system where a z-coordinate is the performance evaluation value;

setting a fourth point of the xy-coordinates (x4, y4) on a first straight line by using x4 which is an x-coordinate and y4 which is a y-coordinate, said x4 being different from said x1, said y4 being different from said y1, the first straight line having a preset slope and passes through the first point in the x and y coordinate system, and detecting z4 which is the performance evaluation value at the fourth point;

setting a fifth point of the xy-coordinates (x5, y5) by using x5 which is an x-coordinate and y5 which is a y-coordinate, said x5 being calculated from a performance evaluation value z5 which is equal to the performance evaluation value z4 using the quadratic approximation curve, said y5 being equal to said y1;

setting a sixth point of the xy-coordinates (x6, y6) by using x6 which is an x-coordinate and y6 which is a y-coordinate, said x6 being calculated from a performance evaluation value z6 which is equal to the performance evaluation value z4 using the quadratic approximation curve, said y6 being equal to said y1;

calculating a performance evaluation value z9 at a ninth point of the xy-coordinates (x9, y9) by using x9 which is an x-coordinate and y9 which is a y-coordinate on the basis of the quadratic approximation curve, said x9 being equal to said x4, said y9 being equal to said y1;

setting a seventh point of the xy-coordinates (x7, y7) by using x7 which is an x-coordinate and y7 which is a y-coordinate, said x7 being equal to said x4, from a performance evaluation value z7 which is equal to the performance evaluation value z4, on the basis of a preset ratio r and the performance evaluation value z9; and calculating an ellipse which passes through the fourth point, the fifth point, the sixth point and the seventh point and calculating an eighth point in the x and y coordinate system, the eighth point being a center point of the ellipse; and said adjusting step includes a step of adjusting the spherical aberration and the focus offset so that the light collecting spot shifts from the first point to the eighth point.

3. The optical information processing method according to claim 1, wherein said signal processing step includes the steps of:

obtaining an x'-coordinate by multiplying the x-coordinate by a coefficient $r^{1/2}$ by using the preset ratio r in the x and y coordinate system;

detecting z1 which is the performance evaluation value at a first point (x'1, y1) of the x'y-coordinates;

setting a second point of the x'y-coordinates (x'2, y2) by using x'2 which is an x'-coordinate and y2 which is a y-coordinate, said x'2 being different from said x'1, said y2 being equal to said y1, and detecting z2 which is the performance evaluation value at the second point;

setting a third point of the x'y-coordinates (x'3, y3) by using x'3 which is an x'-coordinate and y3 which is a y-coordinate, said x'3 being different from both of the x'-coordinates x'1 and x'2 and a y-coordinate y3 being equal to the y-coordinate y1, and detecting z3 which is the performance evaluation value at the third point;

calculating a quadratic approximation curve approximately representing the performance evaluation value by a quadratic function of the x'-coordinate value, on the basis of a first evaluation point (x'1, z1), a second evaluation point (x'2, z2) and a third evaluation point (x'3, z3), in an x' and z coordinate system where the performance evaluation value is a z-coordinate;

setting a fourth point of the x'y-coordinates (x'4, y4) by using x'4 which is an x'-coordinate and y4 which is a y-coordinate, said x'4 being different from said x'1, said y4 being different from said y1, on a first straight line which has a preset slope and passes through the first point in the x' and y coordinate system, and detecting z4 which is the performance evaluation value at the fourth point;

setting a fifth point of the x'y-coordinates (x'5, y5) by using x'5 which is an x'-coordinate and y5 which is a y-coordinate, said x'5 being calculated from the performance evaluation value z5 which is equal to the performance evaluation value z4 using the quadratic approximation curve, said y5 being equal to said y1;

setting a sixth point of the x'y-coordinates (x'6, y6) by using x'6 which is an x'-coordinate and y6 which is a y-coordinate, said x'6 being calculated from the performance evaluation value z6 which is equal to the performance evaluation value z4 using the quadratic approximation curve, said y6 being equal to said y1; and calculating a circle which passes through the fourth point, the fifth point and the sixth point, and calculating an eighth point which is a center point of the circle in the x' and y coordinate system; and said adjusting step includes a step of adjusting the spherical aberration and the focus offset so that the light collecting spot shifts from the first point to the eighth point.

4. The optical information processing method according to claim 1, wherein said signal processing step includes the steps of:

detecting z1 which is the performance evaluation value at the first point of the xy-coordinates (x1, y1);

setting the second point of the xy-coordinates (x2, y2) by using x2 which is the x-coordinate and y2 which is the y-coordinate, said x2 being different from said x1, said y2 being equal to said y1, and detecting z2 which is the performance evaluation value at the second point;

setting the third point of the xy-coordinates (x3, y3) by using x3 which is the x-coordinate and y3 which is the y-coordinate, said x3 being different from both of said x1 and said x2, said y3 being equal to said y1, and detecting z3 which is the performance evaluation value at the third point;

calculating a quadratic approximation curve approximately representing the performance evaluation value by a quadratic function of the x-coordinate value, on the basis of a first evaluation point (x1, z1), a second evaluation point (x2, z2) and a third evaluation point (x3, z3) in an x and z coordinate system where the z-coordinate is the performance evaluation value, and calculating xo which is an x-coordinate where the quadratic approximation curve with respect to the x has an extremum;

setting the fourth point of the xy-coordinates (x4, y4) by using x4 which is the x-coordinate and y4 which is the y-coordinate, said x4 being different from said x1, said y4 being different from said y1, on a first straight line which has a preset slope and passes through the first point in the x and y coordinate system, and detecting z4 which is the performance evaluation value at the fourth point;

calculating z9 which is the performance evaluation value at a ninth point of the xy-coordinates (x9, y9) on the basis of the quadratic approximation curve, by using x9 which is an x-coordinate and y9 which is a y-coordinate, said x9 being equal to said x4, said y9 being equal to said y1; and calculating a quadratic approximation curve approximately representing the performance evaluation value by a quadratic function of the y-coordinate value on the basis of (y4, z4), (y9, z9) and the preset ratio r in a y and z coordinate system, and calculating yo where the quadratic approximation curve with respect to the y has an extremum;

the adjusting step includes a step of adjusting the spherical aberration and the focus offset so that the light collecting spot shifts from the first point to a point of (xo, yo) in the x and y coordinate system.

5. The optical information processing method according to claim 2, wherein the ratio r is $a_1/a_2$, when the performance evaluation value z with respect to said x is given by an equation of a quadratic approximation curve, $$z = a_1 \cdot x^2 + b_1 \cdot x + c_1,$$

and the performance evaluation value z with respect to said y is given by an equation of a quadratic approximation curve, $$z = a_2 19 \, y^2 + b_2 \cdot y + c_2.$$

6. The optical information processing method according to claim 5, wherein the characteristic of the reproduction signal is any of an amplitude value of the reproduction signal, a reproduction jitter value of the reproduction signal and an error rate of the reproduction signal.

7. The optical information processing method according to claim 2, wherein the fourth point is set in a position where the quadratic approximation curve has two real roots indicating x-coordinates at the fourth performance evaluation value z4 which indicates the z-coordinate.

8. The optical information processing method according to claim 6, wherein
the signal processing step includes a step of detecting an amplitude value of a tracking error signal which is stored in advance in a memory, and p1 each of the second point and the third point is a point where the amplitude value of the tracking error signal is not less than the reference value.

9. The optical information processing method according to claim 8, wherein the first straight line is a locus on which the tracking error signal has the same amplitude value in the x and y coordinate system.

10. The optical information processing method according to claim 9, wherein
the signal processing step includes a step of setting a tenth point of the xy-coordinates (x10, y10) by using x10 which is an x-coordinate and y10 which is a y-coordinate, said x10 being different from any of said x1, said x2 and said x3, said y10 being equal to said y2, and detecting z10 which is the performance evaluation value at the tenth point, and the quadratic approximation curve is calculated on the basis of the first evaluation point, the second evaluation point, the third evaluation point and the tenth evaluation point of the xz-coordinates (x10, z10).

11. The optical information processing method according to claim 10, wherein
if a mark as recorded information is provided on the information recording surface of the optical disc, the light irradiating and receiving means includes a means for irradiating the mark with information-reading laser light, and
if no mark as recorded information is provided on the information recording surface of the optical disc, the light irradiating and receiving means includes a means for irradiating a predetermined position on the information recording surface of the optical disc with information-recording laser light in order to record a mark, and a means for irradiating the recorded mark with information-reading laser light.

12. The optical information processing method according to claim 11, wherein the mark is recorded in a data area or a test area on the information recording surface of the optical disc.

13. An optical information processing apparatus comprising:
a light irradiating and receiving means for irradiating an information recording surface of an optical disc with laser light as a light collecting spot and detecting reflected light from the information recording surface of the optical disc;
a signal processing means for detecting shift amount of a first control device for controlling amount of a spherical aberration of the light collecting spot and shift amount of a second control device for controlling amount of a focus offset indicating a shift of the light collecting spot from a correct focal point, from a detection signal of the reflected light outputted by the light irradiating and receiving means, generating a reproduction signal, and detecting a performance evaluation value which indicates characteristic of the reproduction signal; and
an adjusting means for adjusting the spherical aberration on the basis of the shift amount of the first control device and the performance evaluation value and adjusting the focus offset, on the basis of the shift amount of the second control device and the performance evaluation value;
wherein said signal processing means detects the performance evaluation values for a first point, a second point, a third point and a fourth point in an x and y coordinate system, in which an x-coordinate is one of the shift amount of the first control device and the shift amount of the second control device and a y-coordinate is the other, the first point, the second point and the third point having the same y-coordinate and different x-coordinates with each other, the fourth point being provided on a first straight line which passes through the first point, the fourth point and the first point having different x-coordinates and different y-coordinates with each other.

14. The optical information processing apparatus according to claim 13, wherein
said signal processing means includes:
a means for detecting z1 which is the performance evaluation value at a first point of the xy-coordinates (x1, y1);
a means for setting a second point of the xy-coordinates (x2, y2) by using x2 which is an x-coordinate and y2 which is a y-coordinate, said x2 being different from said x1, said y2 being equal to said y1, and detecting z2 which is the performance evaluation value at the second point;

a means for setting a third point of the xy-coordinates (x3, y3) by using x3 which is an x-coordinate and y3 which is a y-coordinate, said x3 being different from both of said x1 and said x2, said y3 being equal to said y1, and detecting z3 which is the performance evaluation value at the third point;

a means for calculating a quadratic approximation curve approximately representing the performance evaluation value by a quadratic function of the x-coordinate value, on the basis of a first evaluation point (x1, z1;), a second evaluation point (x2, z2) and a third evaluation point (x3, z3), in an x and z coordinate system where a z-coordinate is the performance evaluation value;

a means for setting a fourth point of the xy-coordinates (x4, y4) on a first straight line by using x4 which is an x-coordinate and y4 which is a y-coordinate, said x4 being different from said x1, said y4 being different from said y1, the first straight line having a preset slope and passes through the first point in the x and y coordinate system, and detecting z4 which is the performance evaluation value at the fourth point;

a means for setting a fifth point of the xy-coordinates (x5, y5) by using x5 which is an x-coordinate and y5 which is a y-coordinate, said x5 being calculated from a performance evaluation value z5 which is equal to the performance evaluation value z4 using the quadratic approximation curve, said y5 being equal to said y1;

a means for setting a sixth point of the xy-coordinates (x6, y6) by using x6 which is an x-coordinate and y6 which is a y-coordinate, said x6 being calculated from a performance evaluation value z6 which is equal to the performance evaluation value z4 using the quadratic approximation curve, said y6 being equal to said y1;

a means for calculating a performance evaluation value z9 at a ninth point of the xy-coordinates (x9, y9) by using x9 which is an x-coordinate and y9 which is a y-coordinate on the basis of the quadratic approximation curve, said x9 being equal to said x4, said y9 being equal to said y1;

a means for setting a seventh point of the xy-coordinates (x7, y7) by using x7 which is an x-coordinate and y7 which is a y-coordinate, said x7 being equal to said x4, from a performance evaluation value z7 which is equal to the performance evaluation value z4, on the basis of a preset ratio r and the performance evaluation value z9; and a means for calculating an ellipse which passes through the fourth point, the fifth point, the sixth point and the seventh point and calculating an eighth point in the x and y coordinate system, the eighth point being a center point of the ellipse; and said adjusting means includes a means for adjusting the spherical aberration and the focus offset so that the light collecting spot shifts from the first point to the eighth point.

15. The optical information processing apparatus according to claim 13, wherein said signal processing means includes:

a means for obtaining an x'-coordinate by multiplying the x-coordinate by a coefficient $r^{1/2}$ by using the preset ratio r in the x and y coordinate system;

a means for detecting z1 which is the performance evaluation value at a first point (x'1, y1) of the x'y-coordinates;

a means for setting a second point of the x'y-coordinates (x'2, y2) by using x'2 which is an x'-coordinate and y2 which is a y-coordinate, said x'2 being different from said x'1, said y2 being equal to said y1, and detecting z2 which is the performance evaluation value at the second point;

a means for setting a third point of the x'y-coordinates (x'3, y3) by using x'3 which is an x'-coordinate and y3 which is a y-coordinate, said x'3 being different from both of the x'-coordinates x'1 and x'2 and a y-coordinate y3 being equal to the y-coordinate y1, and detecting z3 which is the performance evaluation value at the third point;

a means for calculating a quadratic approximation curve approximately representing the performance evaluation value by a quadratic function of the x'-coordinate value, on the basis of a first evaluation point (x'1, z1), a second evaluation point (x2, z2) and a third evaluation point (x'3, z3), in an x' and z coordinate system where the performance evaluation value is a z-coordinate;

a means for setting a fourth point of the x'y-coordinates (x'4, y4) by using x'4 which is an x'-coordinate and y4 which is a y-coordinate, said x'4 being different from said x'1, said y4 being different from said y1, on a first straight line which has a preset slope and passes through the first point in the x' and y coordinate system, and detecting z4 which is the performance evaluation value at the fourth point;

a means for setting a fifth point of the x'y-coordinates (x'5, y5) by using x'5 which is an x'-coordinate and y5 which is a y-coordinate, said x'5 being calculated from the performance evaluation value z5 which is equal to the performance evaluation value z4 using the quadratic approximation curve, said y5 being equal to said y1;

a means for setting a sixth point of the x'y-coordinates (x'6, y6) by using x'6 which is an x'-coordinate and y6 which is a y-coordinate, said x'6 being calculated from the performance evaluation value z6 which is equal to the performance evaluation value z4 using the quadratic approximation curve, said y6 being equal to said y1; and a means for calculating a circle which passes through the fourth point, the fifth point and the sixth point, and calculating an eighth point which is a center point of the circle in the x' and y coordinate system; and said adjusting means includes a means for adjusting the spherical aberration and the focus offset so that the light collecting spot shifts from the first point to the eighth point.

16. The optical information processing apparatus according to claim 13, wherein said signal processing means includes:

a means for detecting z1 which is the performance evaluation value at the first point of the xy-coordinates (x1, y1);

a means for setting the second point of the xy-coordinates (x2, y2) by using x2 which is the x-coordinate and y2 which is the y-coordinate, said x2 being different from said x1, said y2 being equal to said y1, and detecting z2 which is the performance evaluation value at the second point;

a means for setting the third point of the xy-coordinates (x3, y3) by using x3 which is the x-coordinate and y3 which is the y-coordinate, said x3 being different from both of said x1 and said x2, said y3 being equal to said y1, and detecting z3 which is the performance evaluation value at the third point;

a means for calculating a quadratic approximation curve approximately representing the performance evaluation value by a quadratic function of the x-coordinate value, on the basis of a first evaluation point (x1, z1), a second evaluation point (x2, z2) and a third evaluation point (x3, z3) in an x and z coordinate system where the z-coordinate is the performance evaluation value, and calculating an x-coordinate xo where the quadratic approximation curve with respect to the x has an extremum;

a means for setting the fourth point of the xy-coordinates (x4, y4) by using x4 which is the x-coordinate and y4 which is the y-coordinate, said x4 being different from said x1, said y4 being different from said y1, on a first straight line which has a preset slope and passes through the first point in the x and y coordinate system, and detecting z4 which is the performance evaluation value at the fourth point;

a means for calculating z9 which is the performance evaluation value at a ninth point of the xy-coordinates (x9, y9) on the basis of the quadratic approximation curve, by using x9 which is an x-coordinate and y9 which is a y-coordinate, said x9 being equal to said x4, said y9 being equal to said y1; and a means for calculating a quadratic approximation curve approximately representing the performance evaluation value by a quadratic function of the y-coordinate value on the basis of (y4, z4), (y9, z9) and the preset ratio r in a y and z coordinate system, and calculating yo where the quadratic approximation curve with respect to the y has an extremum;

said adjusting means includes a means for adjusting the spherical aberration and the focus offset so that the light collecting spot shifts from the first point to a point of (xo, yo) in the x and y coordinate system.

17. The optical information processing apparatus according to claim 14, wherein the ratio r is $a_1/a_2$, when the performance evaluation value z with respect to the x is given by an equation of a quadratic approximation curve, $$z=a_1 \cdot x^2+b_1 \cdot x+c_1,$$

and the performance evaluation value z with respect to the y is given by an equation of a quadratic approximation curve, $$z=a_2 \cdot y^2+b_2 \cdot y+c_2.$$

18. The optical information processing apparatus according to claim 17, wherein the characteristic of the reproduction signal is any of an amplitude value of the reproduction signal, a reproduction jitter value of the reproduction signal and an error rate of the reproduction signal.

19. The optical information processing apparatus according to claim 14, wherein the fourth point is set in a position where the quadratic approximation curve has two real roots indicating x-coordinates at the fourth performance evaluation value z4 which indicates the z-coordinate.

20. The optical information processing apparatus according to claim 18, wherein
said signal processing means includes a means for causing to detect an amplitude value of a tracking error signal which is stored in advance in a memory, and
each of the second point and the third point is a point where the amplitude value of the tracking error signal is not less than the reference value.

21. The optical information processing apparatus according to claim 20, wherein the first straight line is a locus on which the tracking error signal has the same amplitude value in the x and y coordinate system.

22. The optical information processing apparatus according to claim 21, wherein
said signal processing means includes a means for setting a tenth point of the xy-coordinates (x10, y10) by using x10 which is an x-coordinate and y10 which is a y-coordinate, said x10 being different from any of said x1, said x2 and said x3, said y10 being equal to said y2, and detecting z10 which is the performance evaluation value at the tenth point, and
the quadratic approximation curve is calculated on the basis of the first evaluation point, the second evaluation point, the third evaluation point and the tenth evaluation point of the xz-coordinates (x10, z10).

23. The optical information processing apparatus according to claim 22, wherein
if a mark as recorded information is provided on the information recording surface of the optical disc, the light irradiating and receiving means includes a means for irradiating the mark with information-reading laser light, and
if no mark as recorded information is provided on the information recording surface of the optical disc, the light irradiating and receiving means includes a means for irradiating a predetermined position on the information recording surface of the optical disc with information-recording laser light in order to record a mark, and a means for irradiating the recorded mark with information-reading laser light.

24. The optical information processing apparatus according to claim 23, wherein the mark is recorded in a data area or a test area on the information recording surface of the optical disc.

* * * * *